United States Patent
Choi et al.

(10) Patent No.: US 11,968,318 B2
(45) Date of Patent: Apr. 23, 2024

(54) MOBILE TERMINAL AND ELECTRONIC APPARATUS INCLUDING MOBILE TERMINAL

(71) Applicant: LG ELECTRONICS INC., Seoul (KR)

(72) Inventors: Kyungrak Choi, Seoul (KR); Hyerim Ku, Seoul (KR); Eunyoung Noh, Seoul (KR); Seungmin Yang, Seoul (KR); Jieun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 330 days.

(21) Appl. No.: 17/432,369

(22) PCT Filed: May 10, 2019

(86) PCT No.: PCT/KR2019/005648
§ 371 (c)(1),
(2) Date: Aug. 19, 2021

(87) PCT Pub. No.: WO2020/171290
PCT Pub. Date: Aug. 27, 2020

(65) Prior Publication Data
US 2022/0394189 A1    Dec. 8, 2022

Related U.S. Application Data

(60) Provisional application No. 62/807,257, filed on Feb. 19, 2019.

(51) Int. Cl.
*H04M 1/02*    (2006.01)
*G06F 3/04817*    (2022.01)
(Continued)

(52) U.S. Cl.
CPC ...... *H04M 1/0214* (2013.01); *G06F 3/04817* (2013.01); *G06F 3/04847* (2013.01);
(Continued)

(58) Field of Classification Search
CPC .. H04M 1/0214; H04M 1/21; H04M 2201/38; H04M 1/185; H04M 1/72409;
(Continued)

(56) References Cited

U.S. PATENT DOCUMENTS 1,086,694 A    2/1914  Winters
2005/0030255 A1    2/2005  Chiu et al.
(Continued)

FOREIGN PATENT DOCUMENTS

CN    103720160 A    4/2014
CN    104820549 A    8/2015
(Continued)

*Primary Examiner* — Nhan T Tran
(74) *Attorney, Agent, or Firm* — Birch, Stewart, Kolasch & Birch, LLP

(57) ABSTRACT

In a control method for an electronic apparatus according to the present invention, in which a mobile terminal comprises a camera comprising a plurality of lenses and a first display unit combined to a case, the case comprising a first body where the mobile terminal is accommodated and a second body where a second display unit is arranged, the control method for an electronic apparatus comprises the steps of: displaying first screen information on the second display unit and displaying a preview screen on the first display unit in response to driving of the camera; detecting a pre-set touch input received by the first display unit; executing an expanded preview mode in response to the pre-set touch input, generating a control signal for displaying, on the second display unit, second screen information corresponding to a camera function related to the preview screen of the first display unit, and transmitting the control signal to the second display unit; and while the preview screen of the first
(Continued)

display unit is displayed, changing the first screen information of the second display unit to the second screen information in response to the control signal.

20 Claims, 36 Drawing Sheets

(51) Int. Cl.
    *G06F 3/04847*     (2022.01)
    *G06F 3/0488*     (2022.01)
    *G06F 3/14*     (2006.01)
    *H04B 1/3888*     (2015.01)
    *H04M 1/21*     (2006.01)
    *H04N 9/73*     (2023.01)
    *H04N 23/63*     (2023.01)

(52) U.S. Cl.
    CPC .......... *G06F 3/0488* (2013.01); *G06F 3/1423* (2013.01); *H04B 1/3888* (2013.01); *H04M 1/21* (2013.01); *H04N 9/73* (2013.01); *H04N 23/632* (2023.01); *H04M 2201/38* (2013.01)

(58) Field of Classification Search
    CPC .......... H04M 1/72412; H04M 2250/16; G06F 3/04817; G06F 3/04847; G06F 3/0488; G06F 3/1423; G06F 2203/04803; G06F 1/1683; G06F 1/1698; G06F 1/26; G06F 3/0481; G06F 2200/1633; G06F 1/1626; G06F 1/1632; G06F 1/1647; G06F 1/1654; G06F 1/266; G06F 1/3265; G06F 1/3287; G06F 3/04883; G06F 3/1431; G06F 3/0483; G06F 9/50; H04B 1/3888; H04N 9/73; H04N 23/632; G09G 2354/00

See application file for complete search history.

(56) References Cited

U.S. PATENT DOCUMENTS

| | | |
|---|---|---|
| 2008/0318636 A1 | 12/2008 | Kim |
| 2011/0060988 A1 | 3/2011 | Mysliwy et al. |
| 2012/0117290 A1 | 5/2012 | Sirpal et al. |
| 2013/0300687 A1 | 11/2013 | Park |
| 2013/0321340 A1* | 12/2013 | Seo ........................ G06F 3/0485 345/174 |
| 2014/0101577 A1 | 4/2014 | Kwak et al. |
| 2014/0101579 A1 | 4/2014 | Kim et al. |
| 2014/0132735 A1* | 5/2014 | Lee ........................ H04N 23/698 348/47 |
| 2016/0103603 A1 | 4/2016 | Sirpal et al. |
| 2016/0301150 A1* | 10/2016 | Choi ..................... G06F 1/1635 |
| 2017/0277499 A1* | 9/2017 | Liang ................... G06F 3/1423 |
| 2017/0285906 A1* | 10/2017 | Kim ....................... G06F 3/0484 |
| 2018/0011676 A1* | 1/2018 | Han ......................... G06F 3/013 |
| 2018/0260368 A1 | 9/2018 | Vagell et al. |
| 2018/0367743 A1* | 12/2018 | Wang ..................... G02B 13/06 |
| 2019/0342440 A1 | 11/2019 | Coverstone |

FOREIGN PATENT DOCUMENTS

| | | | | |
|---|---|---|---|---|
| CN | 105141801 A | 12/2015 | | |
| CN | 105933544 A | 9/2016 | | |
| CN | 106372473 A | 2/2017 | | |
| CN | 106529310 A | 3/2017 | | |
| CN | 106993099 A | 7/2017 | | |
| CN | 107463310 A | 12/2017 | | |
| CN | 108279636 A | 7/2018 | | |
| CN | 108897486 A | 11/2018 | | |
| CN | 107786817 B | * 10/2019 | ........ H04M 1/72569 |
| EP | 2442240 A1 | 4/2012 | | |
| JP | 2018-37079 A | 3/2018 | | |
| KR | 10-2009-0132140 A | 12/2009 | | |
| KR | 10-2010-0030387 A | 3/2010 | | |
| KR | 10-2011-0060298 A | 6/2011 | | |
| KR | 10-2012-0092036 A | 8/2012 | | |
| KR | 10-2014-0046319 A | 4/2014 | | |
| KR | 10-2014-0046345 A | 4/2014 | | |
| KR | 10-2014-0136771 A | 12/2014 | | |
| KR | 10-2016-0036736 A | 4/2016 | | |
| KR | 10-2016-0076760 A | 6/2016 | | |
| KR | 10-2016-0096731 A | 8/2016 | | |
| KR | 10-1737927 B1 | 5/2017 | | |
| KR | 10-2018-0061059 A | 6/2018 | | |

* cited by examiner

FIG. 1B
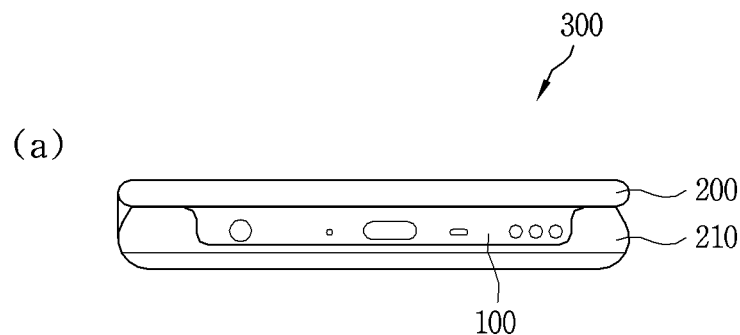
(a)
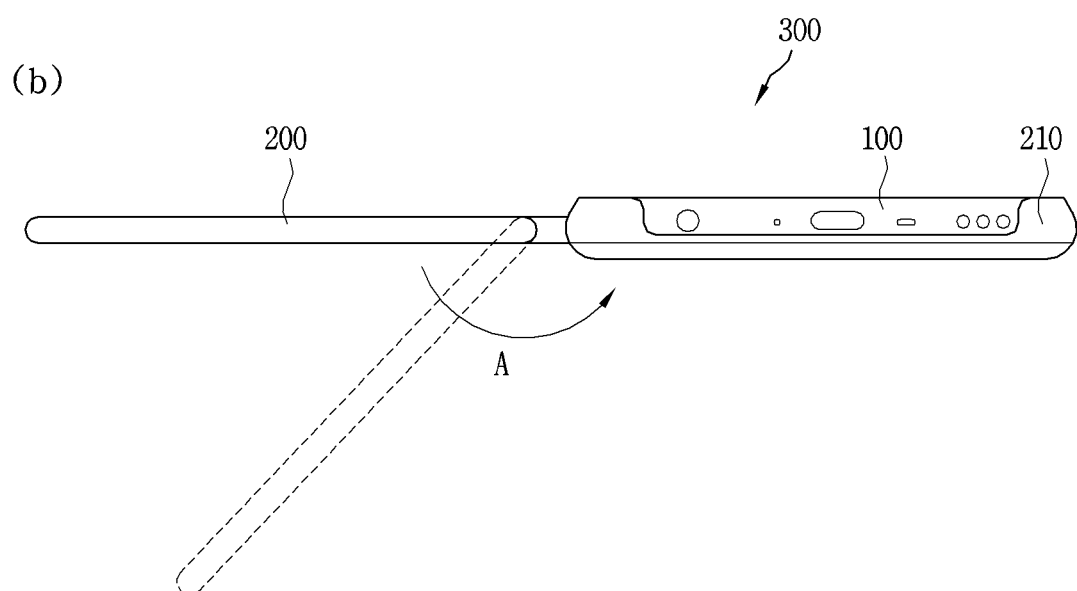
(b)
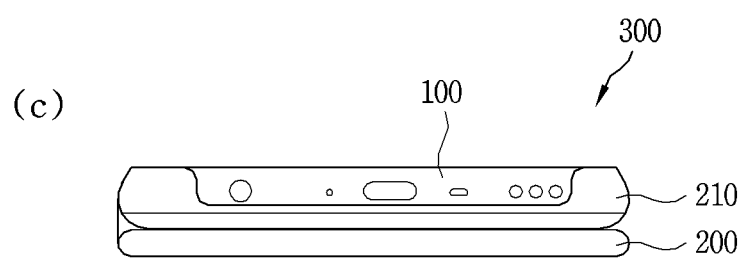
(c)

FIG. 5B
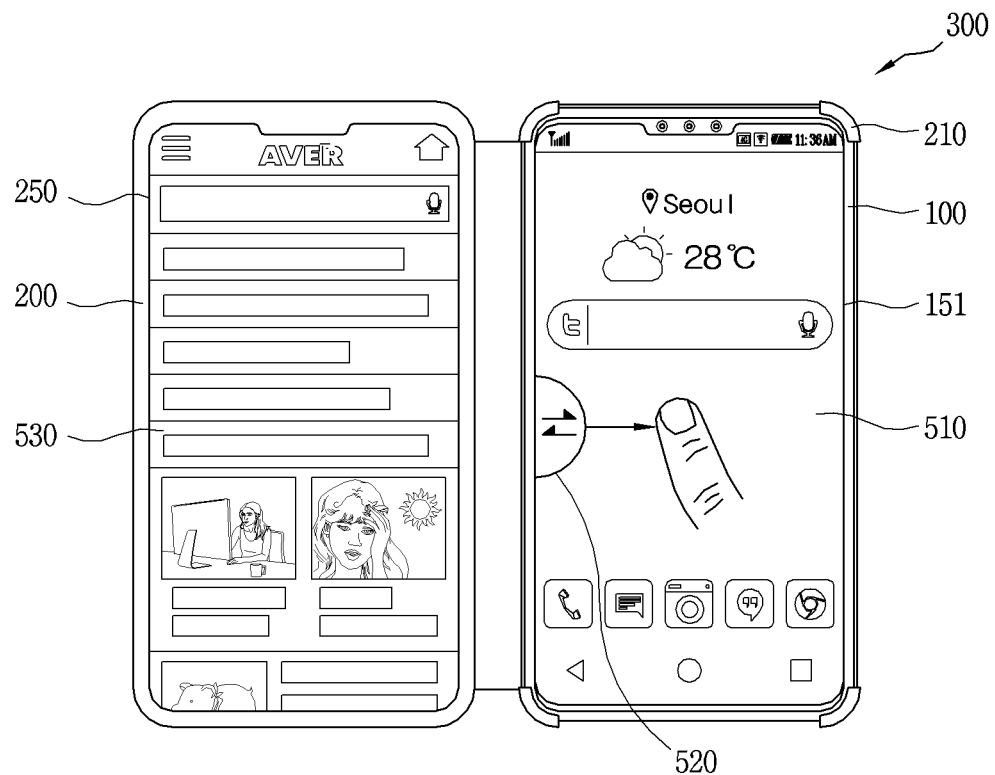
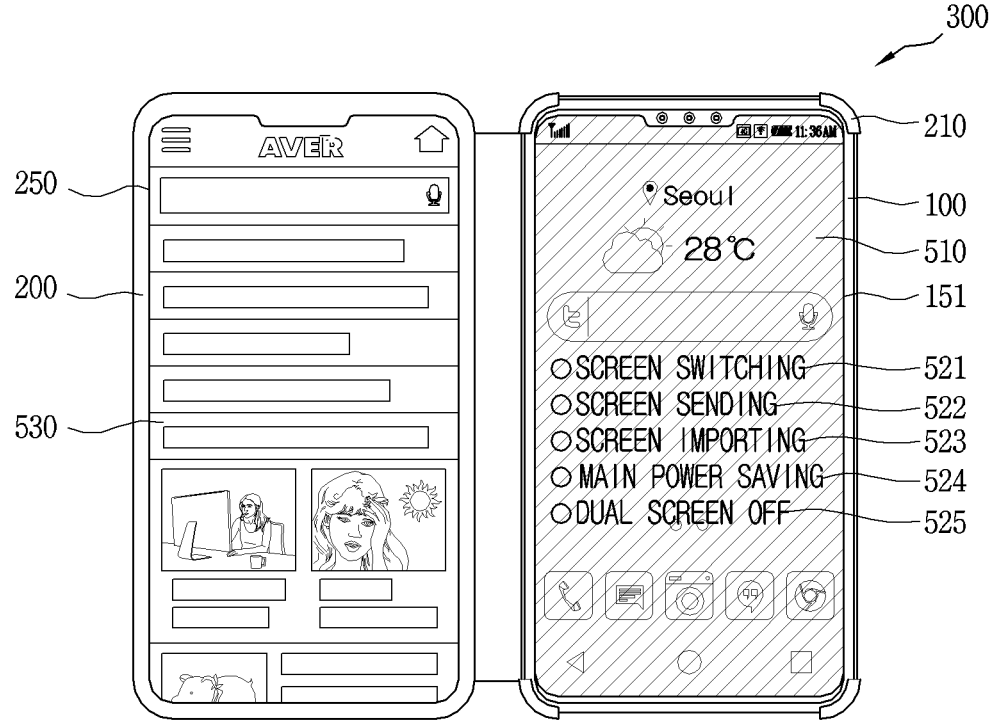

FIG. 5C
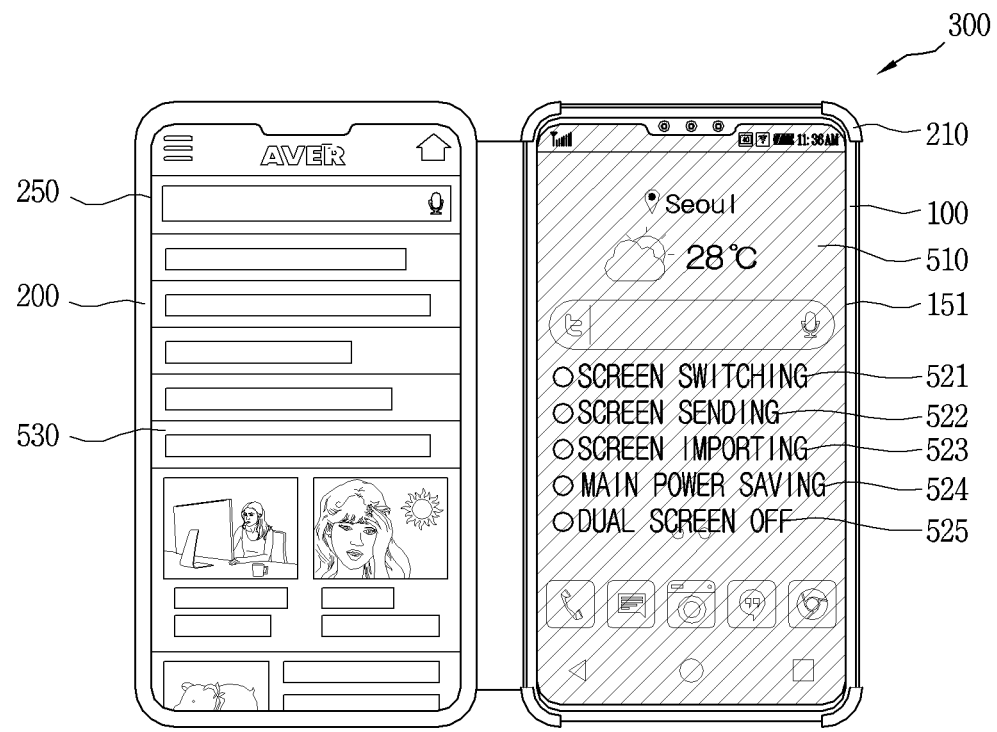
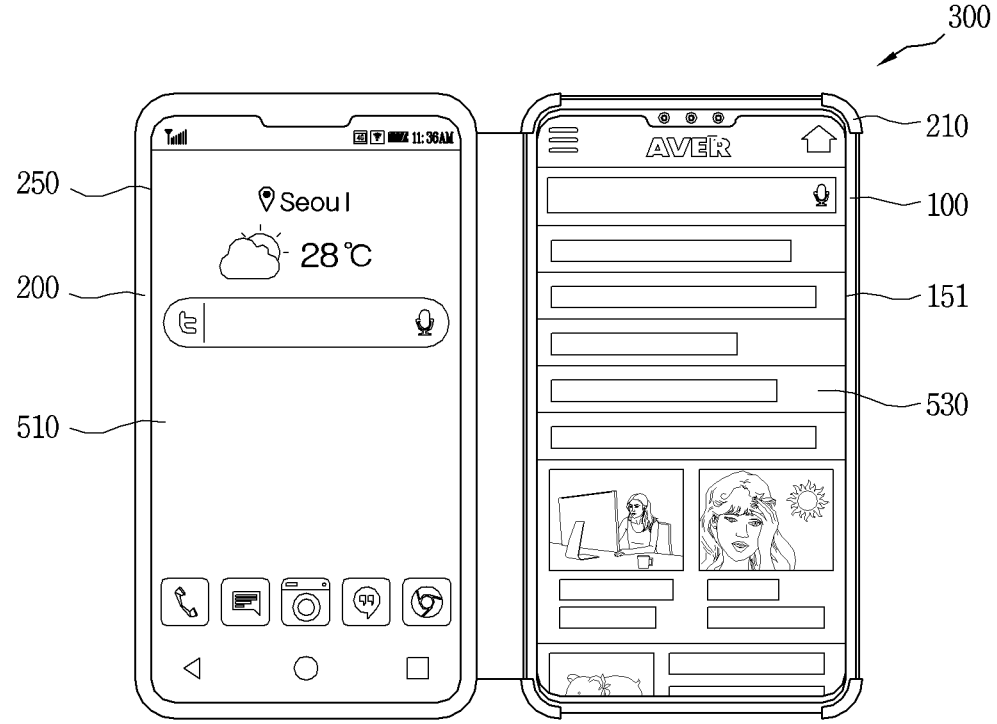

FIG. 5D
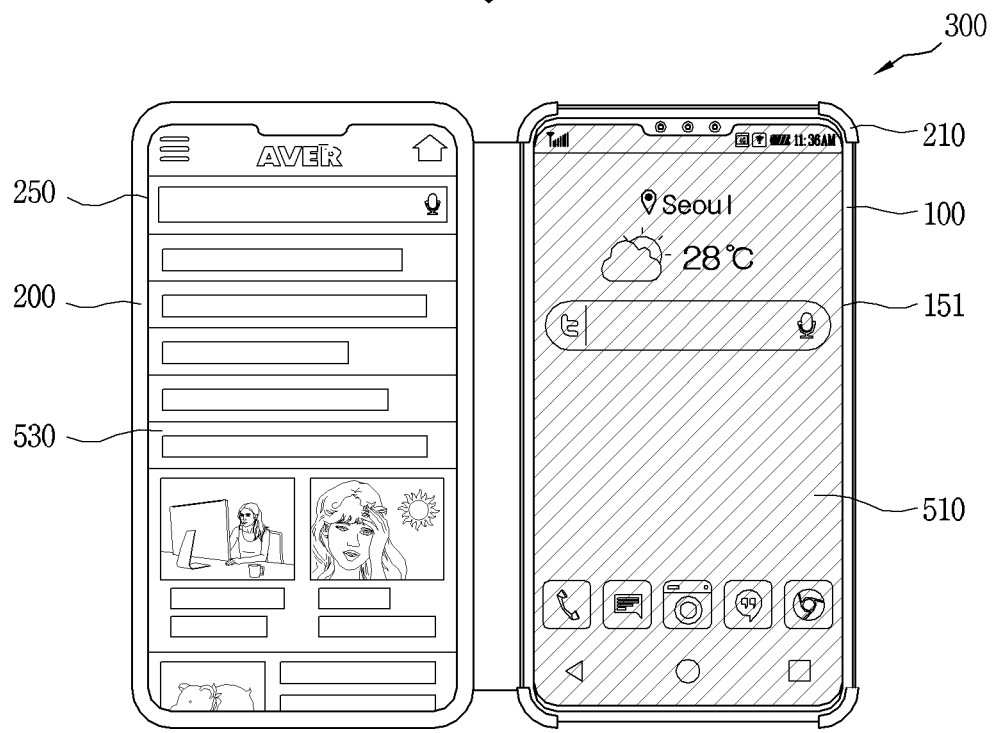

FIG. 5E
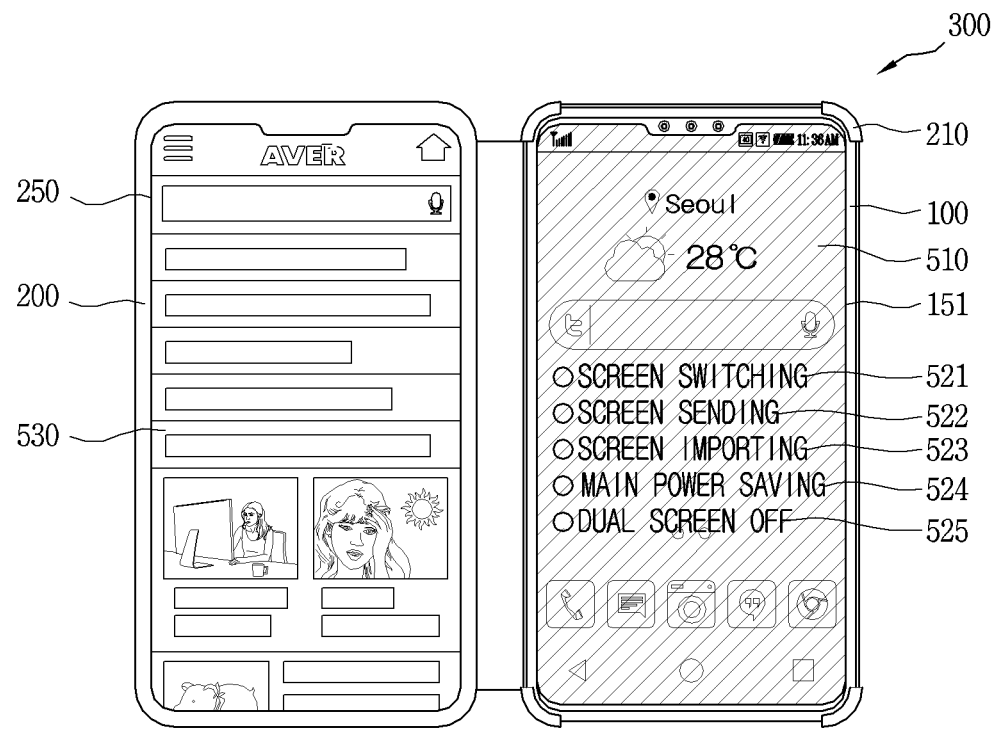
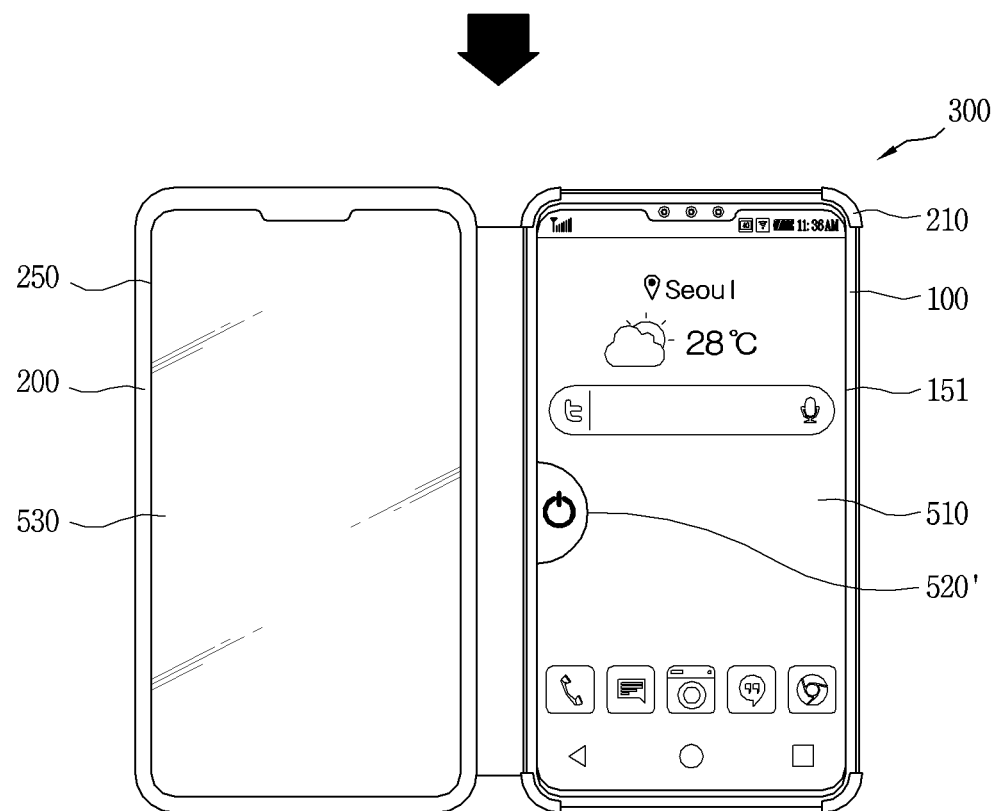

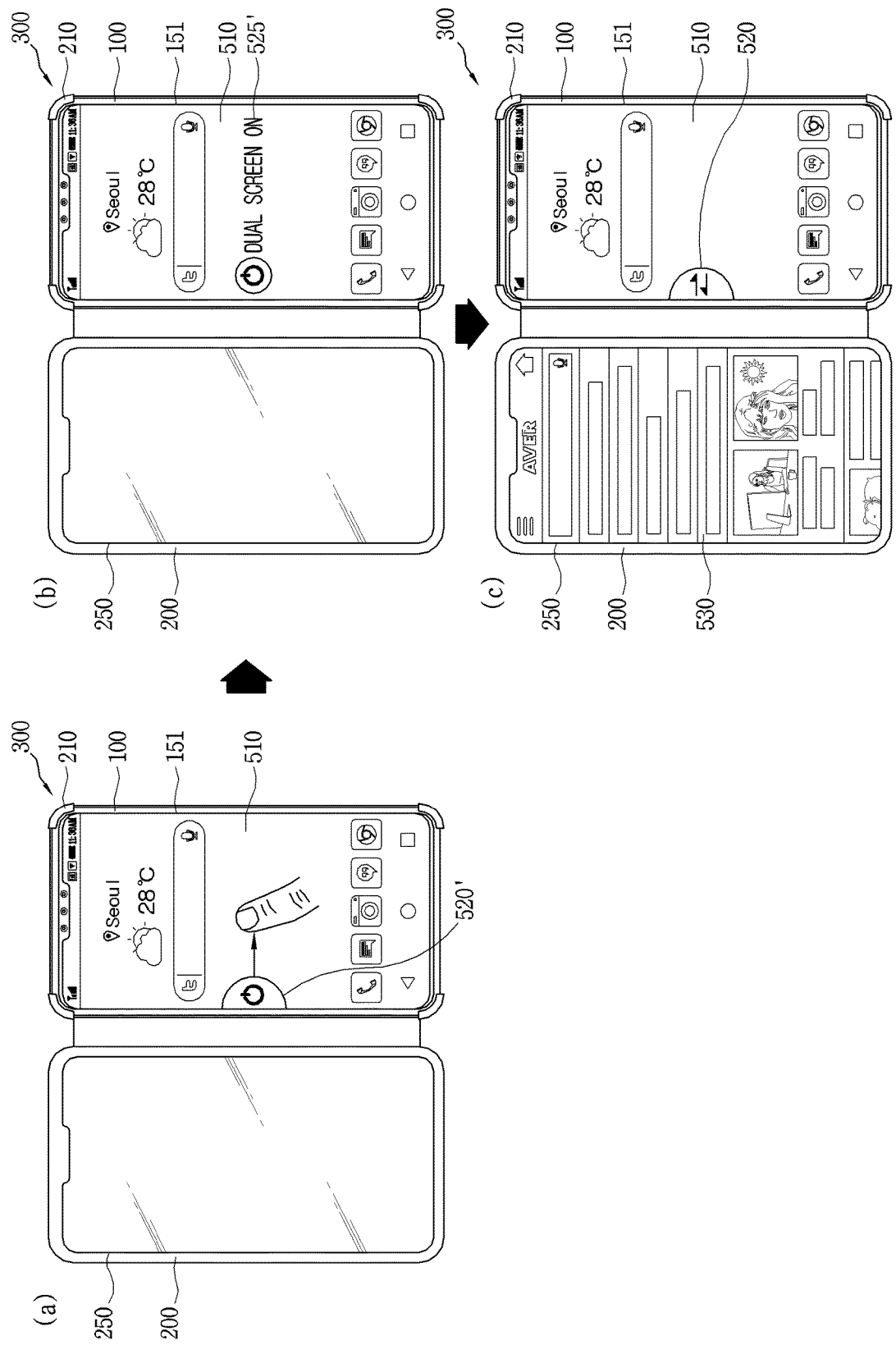

FIG. 5G
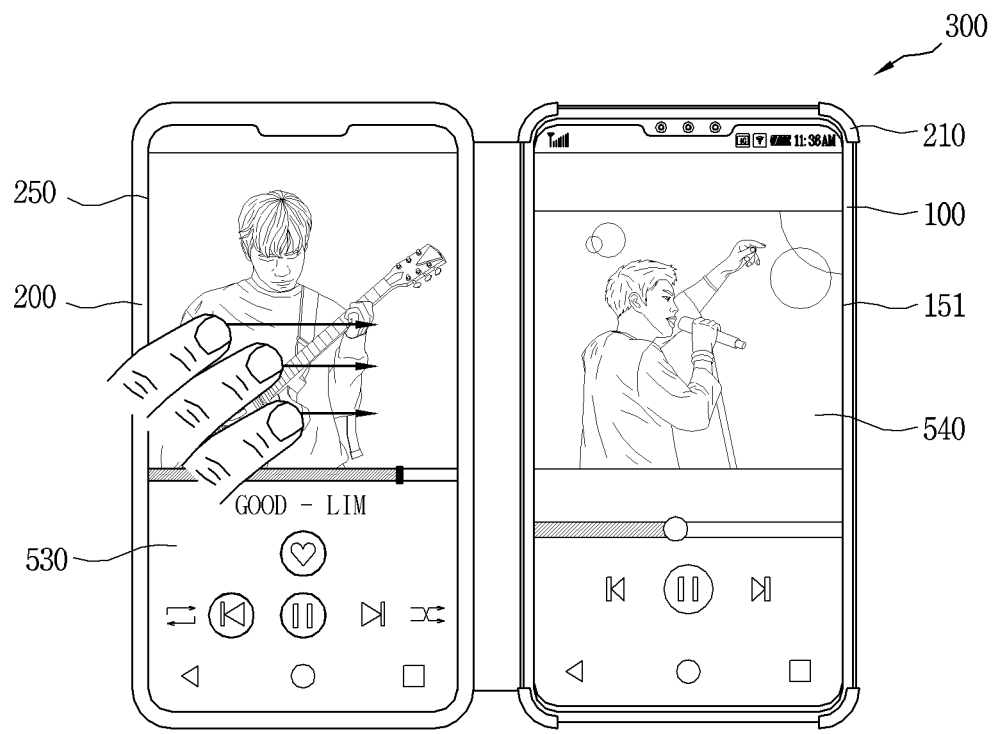
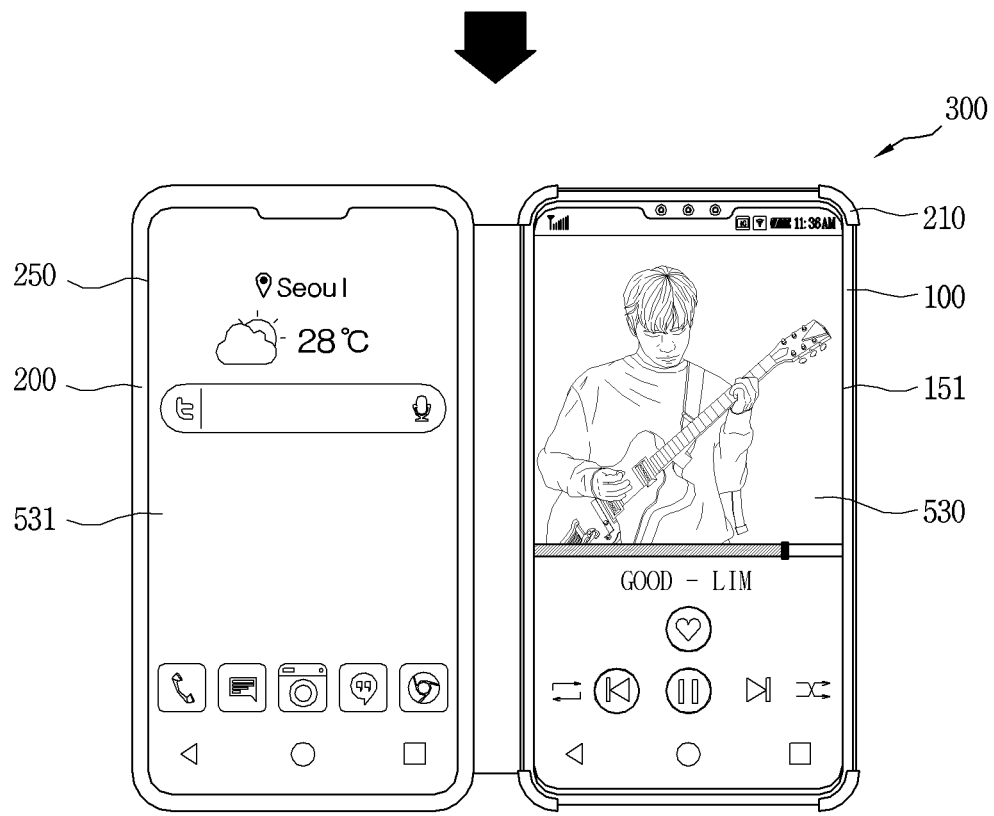

FIG. 5H
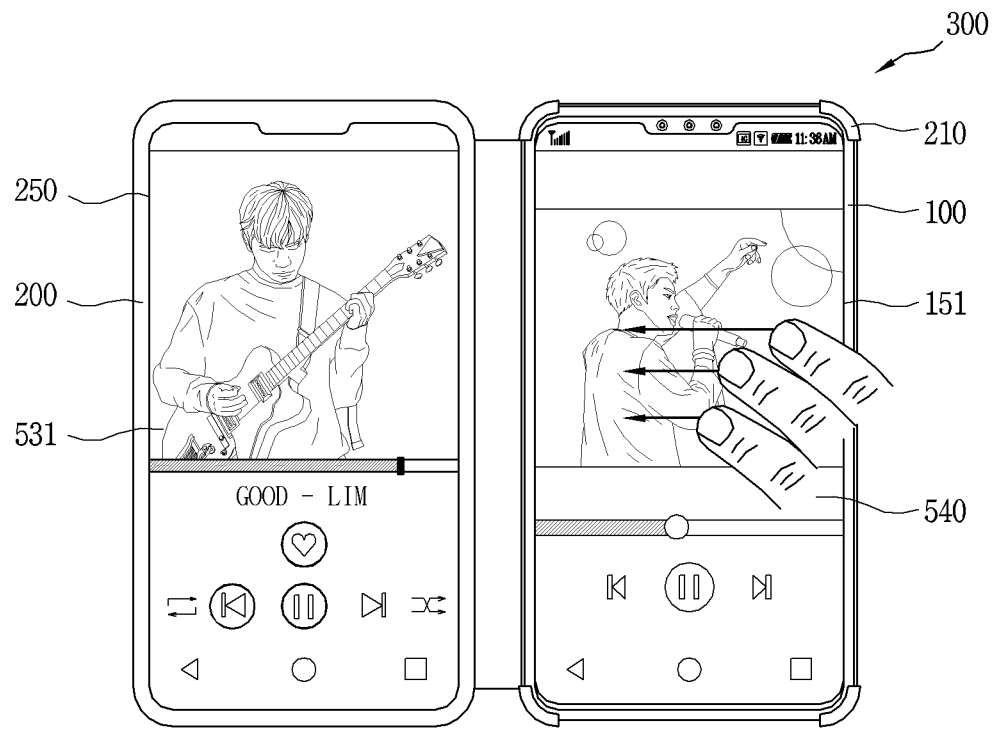
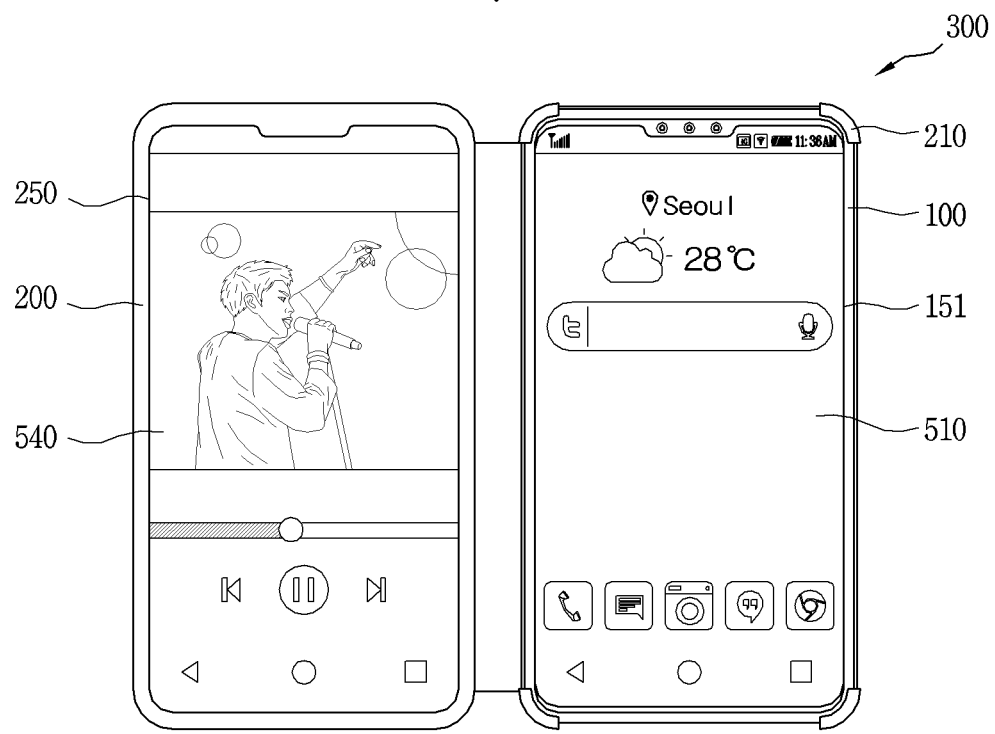

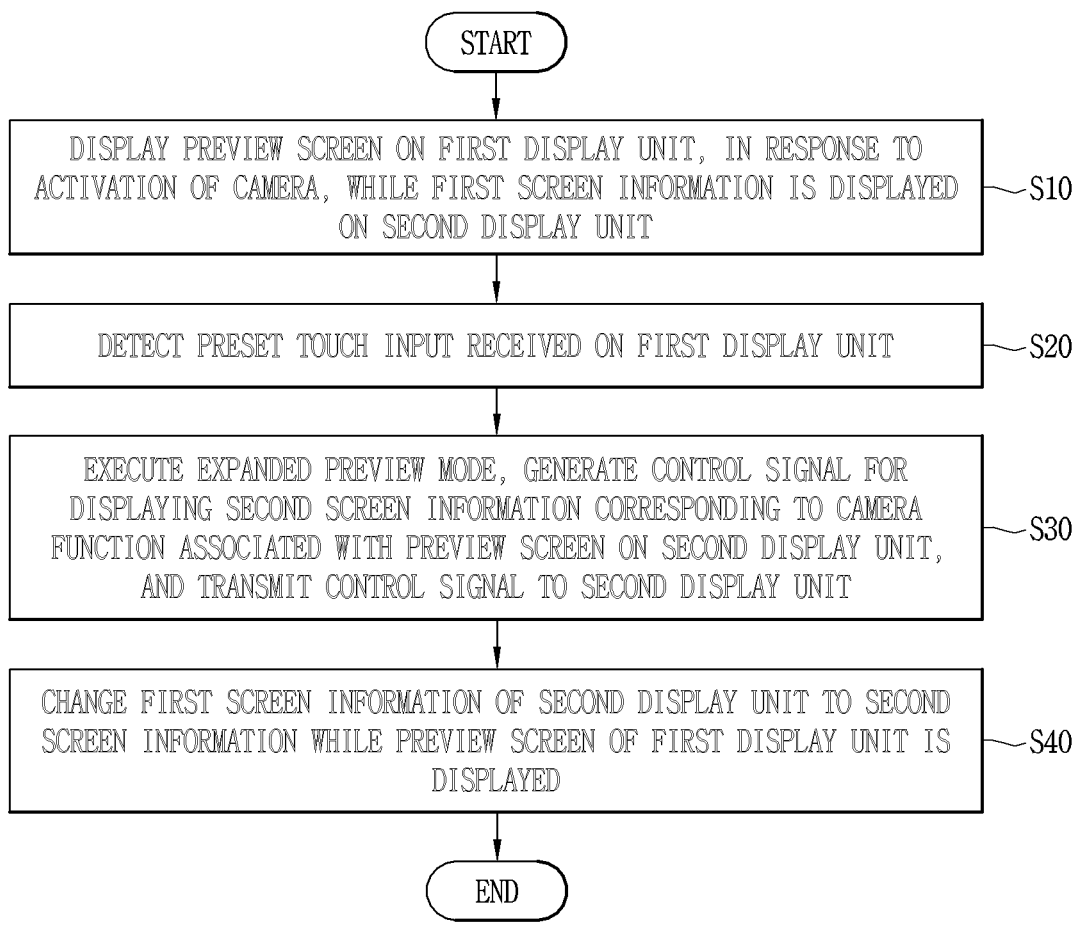

FIG. 17B
(a)
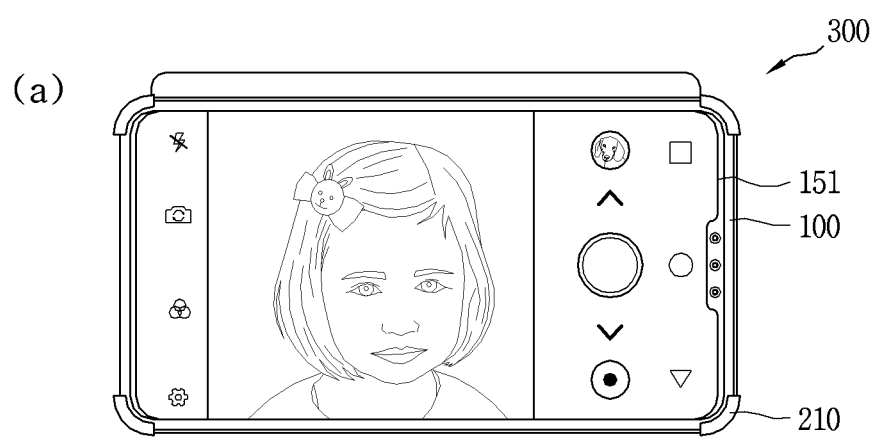
(b)

MOBILE TERMINAL AND ELECTRONIC APPARATUS INCLUDING MOBILE TERMINAL

CROSS REFERENCE TO RELATED APPLICATIONS

This application is the National Phase of PCT International Application No, PCT/KR2019/005648, filed on May 10, 2019, which claims priority under 35 U.S.C. 119(e) to U.S. Provisional Application No. 62/807,257, filed on Feb. 19, 2019, all of which are hereby expressly incorporated by reference into the present application.

FIELD

The present disclosure relates to a mobile terminal, an electronic device having a case coupled to the mobile terminal, and a method for controlling the same.

BACKGROUND

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display. Some electronic devices include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

Meanwhile, in recent years, there is a trend to further expand the usability of a mobile terminal by interoperating with an external device, so as to more efficiently utilize such various functions. In this case, the mobile terminal and the external device interoperating with the mobile terminal may preferably operate independently or interoperably as needed to improve user convenience and usability.

DISCLOSURE

Technical Problem

One aspect of the present disclosure is to provide a mobile terminal capable of expanding a display area by coupling a case having an additional display unit interoperating with the mobile terminal to the mobile terminal, and an electronic apparatus (or electronic device) having the case to which the mobile terminal is coupled.

Another aspect of the present disclosure is to provide a mobile terminal capable of improving usability of various camera functions by more efficiently utilizing such various camera functions using an expanded display area when a camera of the mobile terminal is driven, and an electronic device having a case to which the mobile terminal is coupled.

Still another aspect of the present disclosure is to provide a mobile terminal capable of performing capturing while checking application results of various camera functions in advance by using an expanded display area when a camera of the mobile terminal is driven, and an electronic device having a case to which the mobile terminal is coupled.

Technical Solution

In order to achieve these and other advantages and in accordance with the purpose of this specification, as embodied and broadly described herein, there is provided an electronic apparatus that may include a mobile terminal and a case to which the mobile terminal is coupled. The mobile terminal may include a terminal body coupled to the case, a camera provided on the terminal body and having a plurality of lenses, and a first display unit coupled to the case, and the case may include a first body to accommodate at least a portion of the terminal body, a second body provided with a second display unit, a wiring part electrically connecting the first body and the second body, such that data received from the mobile terminal is transmitted to the second display unit, and a wireless communication unit connected to the wiring part to transmit/receive signals to/from the mobile terminal. A control unit of the mobile terminal, in a state where first screen information is displayed on the second display unit and a preview screen is displayed on the first display unit, may detect a preset touch input received by the first display unit, execute an expanded preview mode according to the preset touch input, generate a control signal for displaying second screen information corresponding to a camera function related to the preview screen on the second display unit so as to transmit the control signal to the second display unit through the wiring part and the wireless communication unit, and switch the first screen information of the second display unit to the second screen information according to the control signal while the preview screen is displayed on the first display unit.

In one implementation, the preview screen of the first display unit may display an icon for selectively applying a plurality of angles of view corresponding to the plurality of lenses to the preview screen. The expanded preview mode may be executed when the preset touch input is applied to the icon. The second display unit may display a plurality of sub preview screens corresponding to the plurality of angles of view as the second screen information.

In one implementation, when a touch signal of a touch input applied to any one of the plurality of sub preview screens displayed on the second display unit is received, the control unit of the mobile terminal may apply an angle of view corresponding to a sub preview screen, to which the touch input has been applied, to a preview screen to be captured, and transmit a control signal for displaying a graphic object indicating the applied angle of view on the one sub preview screen to the second display unit.

In one implementation, an angle of view of a preview screen to be captured may be changed to an angle of view corresponding to a touch input when the touch input for changing the angle of view of the preview screen is applied to the first display unit while the second screen information is displayed, and a control signal for displaying a graphic object indicating the changed angle of view on one of the plurality of sub preview screens may be transmitted to the second display unit.

In one implementation, third screen information, in which one of the sub preview screens included in the second screen information is expanded to the entire second display unit, may be displayed on the second display unit when a touch input is applied to a predetermined area of the second screen information. The one sub preview screen may correspond to an angle of view currently applied to the preview screen of the first display unit, and a capturing icon for capturing the one sub preview screen may be displayed on the third screen information.

In one implementation, when the touch input is applied to the predetermined area of the second screen information, the control unit of the mobile terminal may pop up guide information on the preview screen of the first display unit. Here, the guide information may inform that capturing is allowed to be carried out on the second display unit using the third screen information.

In one implementation, the control unit of the mobile terminal may control the second display unit to change the sub preview screen displayed on the third screen information to a second sub preview screen corresponding to a changed angle of view, in response to a change in the angle of view to be applied to the preview screen based on a touch input applied to the first display unit.

In one implementation, the control unit of the mobile terminal may terminate the expanded preview mode based on a touch input applied to the second screen information, and control the second display unit to display the first screen information while maintaining the preview screen of the first display unit.

In one implementation, in response to a touch input being applied to an icon for executing a reflector capturing function on the first display unit while the second screen information is displayed, a reflector capturing mode may be executed by activating a camera flash of the mobile terminal, and the second display unit may display an image of a reflector to be applied to the preview screen as the second screen information.

In one implementation, the second screen information may output thereon a control bar for adjusting white balance (WB) to be applied to the preview screen of the first display unit in the reflector capturing mode, and the image of the reflector corresponding to the white balance adjusted according to a drag touch input applied to the control bar may change differently.

In one implementation, the plurality of sub preview screens of the second display unit may be displayed by applying an adjusted magnification after a predetermined time elapses, when the magnification of the preview screen is adjusted according to a preset touch gesture applied to the first display unit while the second screen information is displayed.

In one implementation, when the preset touch input is applied to the first display unit, a gallery application may be executed on the second display unit and a first image captured and stored before the preview screen is displayed may be displayed as the second screen information. The first image of the second display unit may be changed to a newly captured and stored second image when the preview screen displayed on the first display unit is captured.

In order to achieve these and other advantages and in accordance with the purpose of this specification, as embodied and broadly described herein, there is provided a method for controlling an electronic apparatus including a mobile terminal and a case to which the mobile terminal is coupled. Here, the mobile terminal may include a camera having a plurality of lenses, and a first display unit coupled to the case, and the case may include a first body to accommodate the mobile terminal and a second body having a second display unit. The method may include displaying first screen information on the second display unit and displaying a preview screen on the first display unit according to an operation of the camera, detecting a preset touch input received by the first display unit, executing an expanded preview mode according to the preset touch input and generating a control signal for displaying second screen information corresponding to a camera function related to the preview screen on the second display unit so as to transmit the control signal to the second display unit, and switching the first screen information of the second display unit to the second screen information according to the control signal while the preview screen is displayed on the first display unit.

Advantageous Effects

As described above, in a mobile terminal and an electronic device having the mobile terminal according to the present disclosure, various camera functions related to a preview screen can be used more efficiently by using an expanded display area.

In the present disclosure, a plurality of sub preview screens, to which a plurality of angles of view are applied, can be previewed on a large screen through a second display unit while maintaining a size of a preview image of a camera displayed on a first display unit.

Capturing a subject can be carried out by selecting an appropriate angle of view while viewing images, to which different angles of view have been actually applied, through the second display unit, thereby simultaneously improving user convenience and usability.

A reflector function can be provided on a preview screen displayed on the first display unit by using the second display unit, such that contrast of an image can be mitigated, a brighter image can be obtained, and soft light can be applied to a subject even when capturing against light.

BRIEF DESCRIPTION OF THE DRAWINGS

FIGS. 1A and 1B are conceptual views illustrating an electronic device in accordance with the present disclosure.

FIGS. 5A to 5H are conceptual views illustrating various implementations of a method for controlling screens of a plurality of display units using a first display unit provided on a mobile terminal, in an electronic device in accordance with the present disclosure.

FIG. 6 is a representative flowchart illustrating operation processes of a control method of an electronic device in accordance with the present disclosure.

FIGS. 8A, 8B, 8C, 8D, 8E, 9A, 9B, 10A, 10B, 100, 10D, 11A, 11B, 12A, 12B, 12C, 13A, 13B and 13C are various exemplary views related to executing an expanded preview mode, a mirroring mode, a reflector capturing mode, and a stored image checking mode, to which a plurality of angles of view corresponding to a plurality of lenses are selectively applied, using a second display unit while a preview image is displayed in response to an activation of a first display unit, in an electronic device in accordance with the present disclosure.

FIGS. 14A, 14B, 14C, 15A, 15B, 16A, 16B, 17A, and 17B are views illustrating various implementations related to a screen control of first and second display units while a preview image on the first display unit is captured in response to an activation of a camera on the first display unit.

MODES FOR CARRYING OUT THE PREFERRED IMPLEMENTATIONS

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1A:
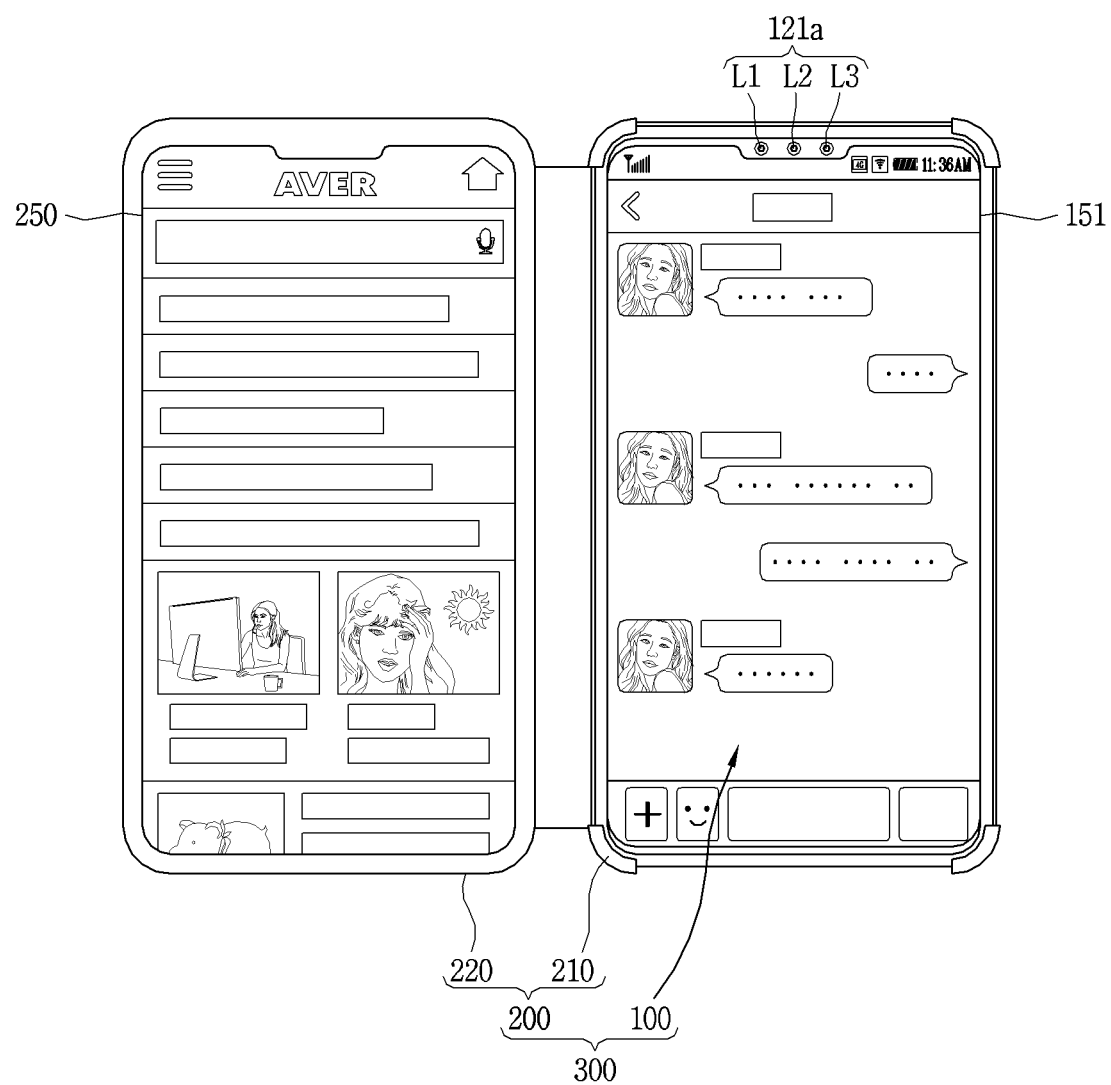

FIGS. 1A and 1B are conceptual views illustrating an electronic device according to the present disclosure.

Referring to the drawings, a mobile terminal 100 may be coupled to a case 200. The mobile terminal 100 and the case 200 may be coupled to configure one electronic device (or electronic apparatus) 300.

In this case, the mobile terminal may be one of a cellular phone, a smart phone, a laptop computer, a digital broadcast terminal, a personal digital assistant (PDA), a portable multimedia player (PMP), a navigator, a slate PC, a tablet PC, a ultra book, and a wearable device (for example, a smart watch, smart glass, a head mounted display (HMD), and the like). Details of the mobile terminal will be described later with reference to FIGS. 3A to 3C.

The case 200 may be a pouch that protects an outer appearance of the mobile terminal 100 or is provided as an accessory of the mobile terminal 100 to cover or accommodate at least one surface of the mobile terminal 100. The case 200 may be coupled to the mobile terminal to extend the function of the mobile terminal 100.

Meanwhile, in the present disclosure, information output from the mobile terminal may be processed in connection with the structure or function of the case 200. As an example of this, referring to FIG. 1A, the case 200 may include a display (or display unit) (hereinafter, referred to as "second display unit 250") interoperating with a display (hereinafter, referred to as "first display unit 151") of the mobile terminal 100.

The case 200 may include first and second bodies 210 and 220 connected to be rotatable relative to each other. The second display unit 250 may be disposed on one of the first and second bodies 210 and 220.

For example, the first body 210 may accommodate at least a portion of the mobile terminal body. A rear side of the mobile terminal may be accommodated in the first body 210, and accordingly the first display unit 151 disposed on a front side of the mobile terminal may be externally exposed.

In this case, the mobile terminal 100 may be detachably coupled to the first body 210. In addition, the mobile terminal may be configured to detect whether it is coupled to the first body 210. For the detection, the first body 210 may include a magnet 245 (see FIG. 4) on one surface facing the mobile terminal 100. The mobile terminal 100 may include a hall sensor 143 (see FIG. 4) disposed on its rear side to sense a magnetic field corresponding to the magnet 245 when the body of the mobile terminal is coupled to the first body 210. When the magnetic field is sensed by the hall sensor, the mobile terminal may recognize that it has been coupled to the case and perform a preset control.

For example, when the magnetic field is sensed by the hall sensor 143, a control unit 180 of the mobile terminal 100 may control a power supply unit 190 to supply an operating current to the second display unit 250 disposed on the second body 220.

That is, the second display unit 250 provided on the second body 220 may be operated by power supplied from the mobile terminal 100.

On the other hand, the second display unit 250 may be disposed on the second body 220 to perform a function of expanding a display area of the first display unit 151 or to operate independent of the first display unit 151. For example, contents related to information output on the first display unit 151 may be mirrored to be output on the second display unit 250.

In addition, execution screens of different applications may be output to the first and second display units 151 and 250. As another example, the first and second display units 151 and 250 may output an execution screen of one application to divided areas.

Meanwhile, the first and second display units 151 and 250 may be externally exposed together in an open state, and the open state may be defined with reference to FIG. 1B.

In addition, the mobile terminal 100 may be configured to control screen information output to the second display unit 250, and for this purpose, at least one of wired and wireless communication links may be established between the mobile terminal 100 and the second display unit 250.

In addition, the mobile terminal 100 may be configured to supply an operating current to the second display unit 250. The operating current may be supplied from the mobile terminal 100 to the second display unit 250 through a wire provided in the case 200.

Referring to FIG. 1B, the first and second bodies 210 and 220 of the case 200 may rotate relative to each other between a closed state and a fully opened state.

The closed state may be a state shown in (a) of FIG. 1B, in which the first body 210 of the case 200 covers the first display unit 151 of the mobile terminal 100 and the first display unit 151 is obscured by the first body 210. That is, the state in which the first display unit 151 is covered by the second display unit 250 may be the closed state. In the closed state, the mobile terminal 100 and the case 200 may overlap each other in the form like a diary in a thickness direction of the mobile terminal, which may enhance user's portability.

Also, in this case, front surfaces of the first and second display units 151 and 250 may face each other. The front surfaces may be outer surfaces which display visual information and receive touch inputs.

The closed state may be switched to the open state as the second body 220 is rotated with respect to the first body 210. The open state may be a state in which the first display unit 151 is not obscured by the second display unit 250, and thus a state in which an angle formed between the first and second display units 151 and 250 is a specific angle other than 0 degree may be referred to as the open state.

(b) of FIG. 1B illustrates an open state in which the first and second display units 151 and 250 form 180 degrees with each other. The foregoing example of FIG. 1A illustrates the state in which the first and second display units 151 and 250 form 180 degrees with each other. In addition, in the open state, the first and second bodies 210 and 220 may be fixed at a specific angle, and for this purpose, a fixing member may be provided in the case 220.

As illustrated in (b) of FIG. 1B, the first and second bodies 210 and 220 may further rotate relative to each other in a direction A. Accordingly, as illustrated in (c) of FIG. 1B, the first and second bodies 210 and 220 can relatively rotate up to 360 degrees. This open state may be defined as a 'fully open state'.

In addition, when the first and second bodies 210 and 220 relatively rotate within a range that is greater than 180 degrees and less than 360 degrees, this open state may be defined as a "bent state". The "bent state" in which the first body 210 is bent toward the rear side of the case may be detected through a connecting portion for connecting the first and second bodies 210 and 220 or a sensor separately provided in the connecting portion.

In this case, the first and second bodies 210 and 220 are superimposed on each other, and the first and second display units 151 and 250 may face outward, respectively. That is, the first and second display units 151 and 250 may face opposite directions.

Meanwhile, the mobile terminal may be configured to detect the closed state and the open state. In a related example, the mobile terminal may include a light sensor for sensing ambient illuminance, and the control unit 180 of the mobile terminal 100 may detect one of the closed state and the open state according to the illuminance sensed by the light sensor.

The control unit 180 may also separately detect a fully open state from among the open states.

The electronic device 300 of the present disclosure may perform an operation of controlling the first and second display units 151 and 250 in cooperation with the open state and the closed state. For example, in the closed state, the first and second display units 151 and 250 may be driven in an inactive state, When the closed state is switched to the open state, at least one of the first and second display units 151 and 250 may be activated.

As an example, when the closed state is switched to the open state, both the first display unit 151 and the second display unit 250 may be switched to an active state. In this case, different home screen pages may be respectively output to the first and second display units 151 and 250, or the same home screen page may be displayed all over the first and second display units 151 and 250. In addition, various information may be output to the first and second display units 151 and 250 according to circumstances.

As another example, when the closed state is switched to the open state, the first display unit 151 may be switched to an active state and the second display unit 250 may be maintained in an inactive state.

The second display unit 250 may include a touch sensor for sensing a touch applied to the second display unit 250.

The second display unit 250 may be configured to sense a touch even in the inactive state.

In relation to touch sensing of the touch sensor, the second display unit 250 may be switched to the active state in the open state when a touch applied to the second display unit 250 corresponds to a preset type of touch (preset touch).

Meanwhile, when a touch is applied to the second display unit 250, the second display unit 250 may transmit a touch signal corresponding to the touch to the mobile terminal 100. In addition, when the touch according to the received touch signal corresponds to a preset touch, the mobile terminal 100 may transmit a signal corresponding to a control command for activating the second display unit 250 to the second display unit 250.

Then, the second display unit 250 may be activated based on the signal received from the mobile terminal 100.

Meanwhile, in order to implement the operation of the electronic device described above, the case may have a new structure. Hereinafter, such a structure of the case will be described in more detail.

Figure 2A:
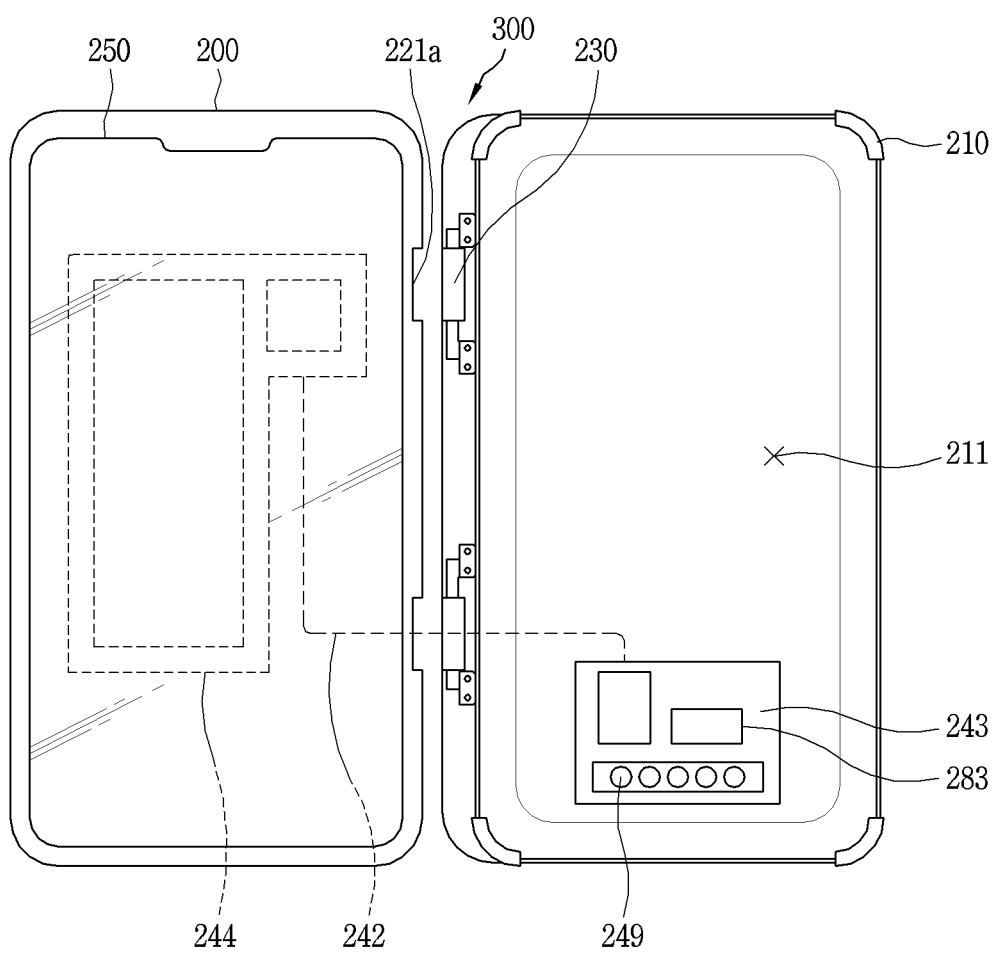
FIGS. 2A, 2B, and 2C are conceptual views illustrating a main structure of an electronic device in accordance with the present disclosure.
Figure 2B:
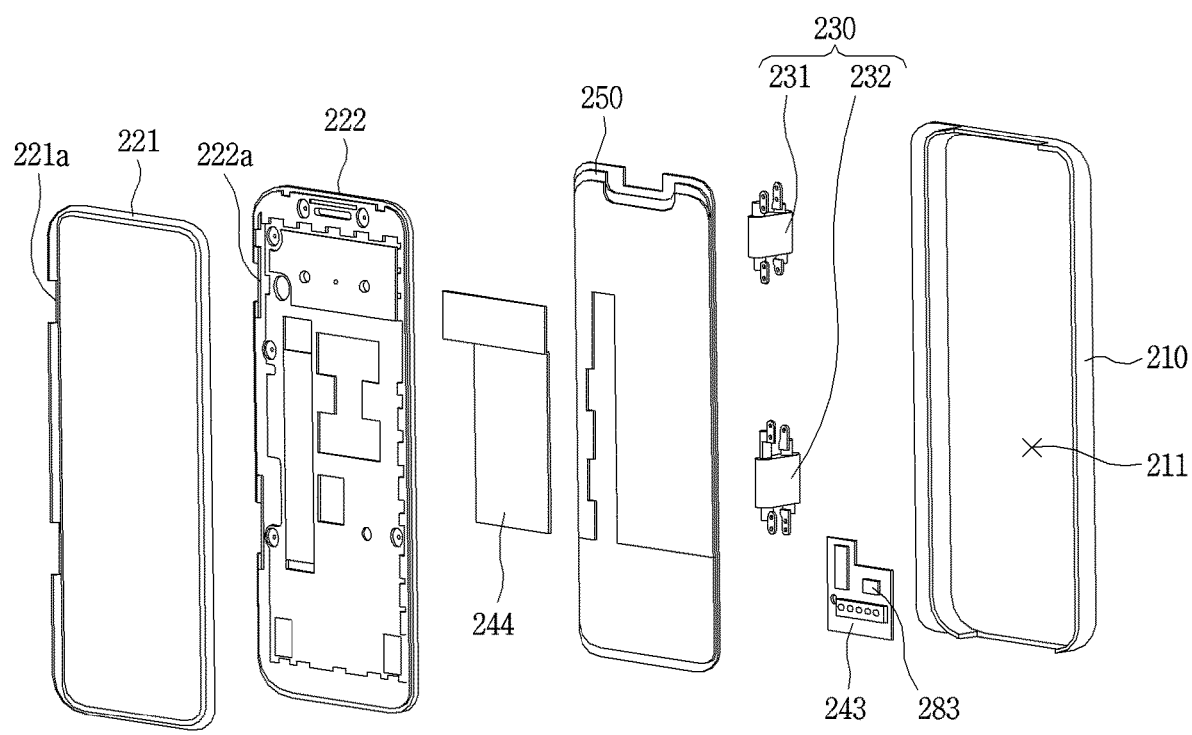
Figure 2C:
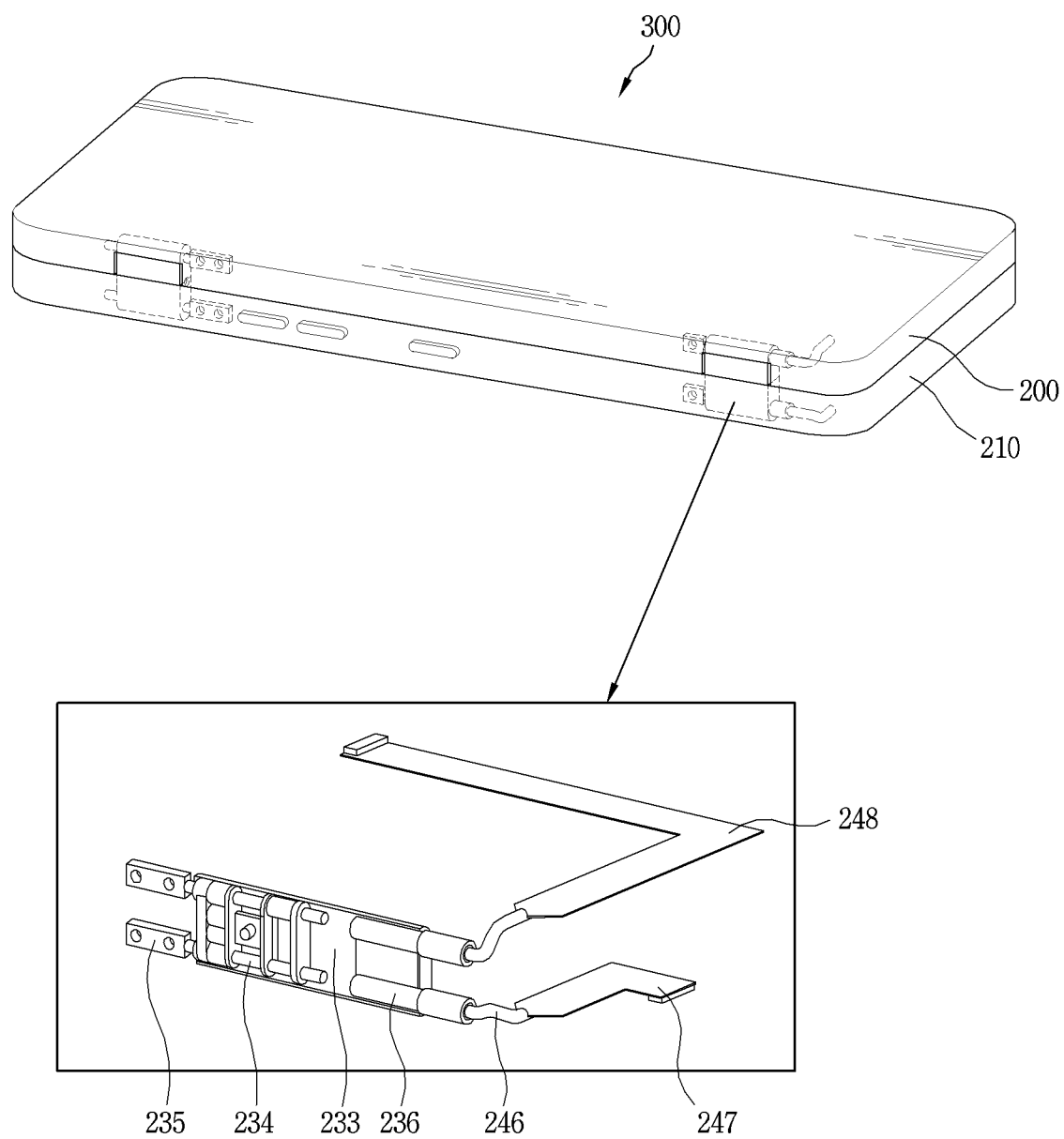

FIGS. 2A, 2B, and 2C are conceptual views illustrating a main structure of an electronic device in accordance with the present disclosure.

The first body 210 of the case 200 may have an accommodation space 211 in which a rear surface of the body of the mobile terminal is accommodated. The first body may accommodate at least a portion of the mobile terminal in the accommodation space 211, and the rear surface of the mobile terminal may be disposed on a bottom surface of the accommodation space 211. However, the present disclosure is not necessarily limited thereto, and for example, the first body may be formed in a plate shape coupled to the rear surface of the mobile terminal, or may be configured to be coupled to a side surface of the mobile terminal.

The second body 220 on which the second display unit 250 is disposed may be rotatably coupled to the first body by a connecting portion 230. More specifically, the connecting portion 230 may be disposed between the first and second bodies 210 and 220 such that the first and second bodies 210 and 220 can rotate relative to each other.

Referring to the drawings, the second body 220 may include a first cover 221, a second cover 222, and a second display unit 250. An accommodating groove 221a in which at least a part of the connecting portion 230 is accommodated may be formed in the first cover 221. The second cover 222 may be coupled to the first cover 221 and may be a frame to which various electronic components are mounted. As an example, a second circuit board to be described later may be mounted on the second cover 222.

The second cover 222 may be rotatably coupled to the connecting portion 230. The second cover 222 may include a groove 222a at a position corresponding to the accommodating groove 221a of the first cover 221, and the connecting portion 230 may be disposed in the groove 222a. In this case, the second display unit 250 may be mounted to the second cover 222.

The connecting portion 230 may include first and second hinges 231 and 232 spaced apart from each other along a side surface of the first body 210. The first and second hinges 231 and 232 each may include a hinge body 233 and a hinge shaft 234.

A hinge groove (not shown) may be formed in the hinge body 233. The hinge shaft 234 may be inserted into the hinge groove so that the first and second bodies 210 and 220 can rotate relative to each other. The hinge shaft 234 may be provided in plurality, each of which may include a coupling portion 235 disposed on one side thereof to be coupled to the first and second bodies 210 and 220.

In this case, the case 200 may include a wireless communication unit 283 and a wiring part 242, through which the mobile terminal 100 can control the second display unit 250.

The wireless communication unit 283 may be disposed in the first body 210 to perform short-range wireless communication with the mobile terminal. The mobile terminal 100 may include a wireless communication unit (hereinafter, referred to as a "first wireless communication unit") that performs short-range wireless communication with a wireless communication unit (hereinafter referred to as a "second wireless communication unit") of the case 200.

The first wireless communication unit 116 (see FIG. 3C) may transmit a radio signal (wireless signal) to the rear of the mobile terminal 100, and the second wireless communication unit 283 may be disposed in the first body 210 to face the first wireless communication unit 116 so as to receive the radio signal. The first wireless communication unit 116 and the second wireless communication unit 283 each may include, for example, a Keyssa chip for wireless data transmission and reception, and the Keyssa chips may be disposed at positions with being spaced apart from each other by a distance of several cm or less along a thickness direction of the mobile terminal. Accordingly, the first wireless communication unit 116 and the second wireless communication unit 283 may perform communication through a short-range communication method having a transmission distance of about several cm.

As illustrated, the first body 210 may include a first circuit board 243 on which the second wireless communication unit 283 is disposed, and the second body 210 may include a second circuit board 244 that is disposed beneath the second display unit 250 and electrically connected to the first circuit board 243 through the wiring part 242. The second circuit board 244 may be connected to the second display unit 250 and perform a function of transferring a control signal received from the mobile terminal 100 to the second display unit 250.

That is, the second circuit board 244 may transfer the data transmitted and received between the first wireless communication unit 116 and the second wireless communication unit 283 to the second display unit 250.

The wiring part 242 may be a portion by which the first and second bodies 210 and 220 are electrically connected through the connecting portion 230. The radio signal (or data) received through the short-range wireless communication with the mobile terminal 100 may be transferred to the second display unit 250 through the wiring part 242. For this connection, a connection passage through which the wiring part 242 passes may be defined in the connecting portion 230.

As an example, an accommodation space for accommodating at least a portion of the wiring part 242 may be defined in any one of the first and second hinges 231 and 232. More specifically, the first hinge 231 may be closer to an upper side of the mobile terminal than the second hinge 232, and the second hinge 232 may be closer to a lower side of the mobile terminal 100 than the first hinge 231. The second circuit board 244 may be disposed adjacent to a lower end of the case 200, and thus the first wireless communication unit 116 and the second wireless communication unit 283 may be respectively connected to the lower side of the case 200 or the mobile terminal 100.

In this structure, the accommodation space may be defined in the second hinge 232. The second hinge 232 may include an extension portion 236 extending from the hinge body 233. The extension portion 236 may include a cable 246 extending to the first body 210 and the second body 220. The accommodation space may be defined in the extension portion 236 and the cable 246 may be accommodated in the accommodation space. First and second flexible circuit boards 247 and 248 may be disposed at both ends of the cable 246, respectively, and the first and second flexible circuit boards 247 and 248 may be electrically connected to the first and second circuit boards 243 and 244. With this structure, a signal for controlling the second display unit 250 may be wirelessly transmitted from the mobile terminal to the first body 210 and transmitted to the second body 220 through a wire.

Meanwhile, referring to the drawings, the first circuit board 243 may include a power terminal (e.g., pogo-pin, 249) that is brought into contact with a power supply terminal (not shown) of the mobile terminal to receive power from the mobile terminal. The power terminal 249 may be electrically connected to the wiring part 242 to supply power to the second display unit 250. With this structure, power supplied to the second display unit 250 may be transmitted from the mobile terminal through a wired path.

According to the structure described above, the electronic device can perform an operation of controlling the first and second display units 151 and 250 in an interoperating manner by using short-range wireless communication and a wired power supply path. Hereinafter, structure and functions of the mobile terminal will be described in detail, and then the control operation will be described.

Figure 3A:
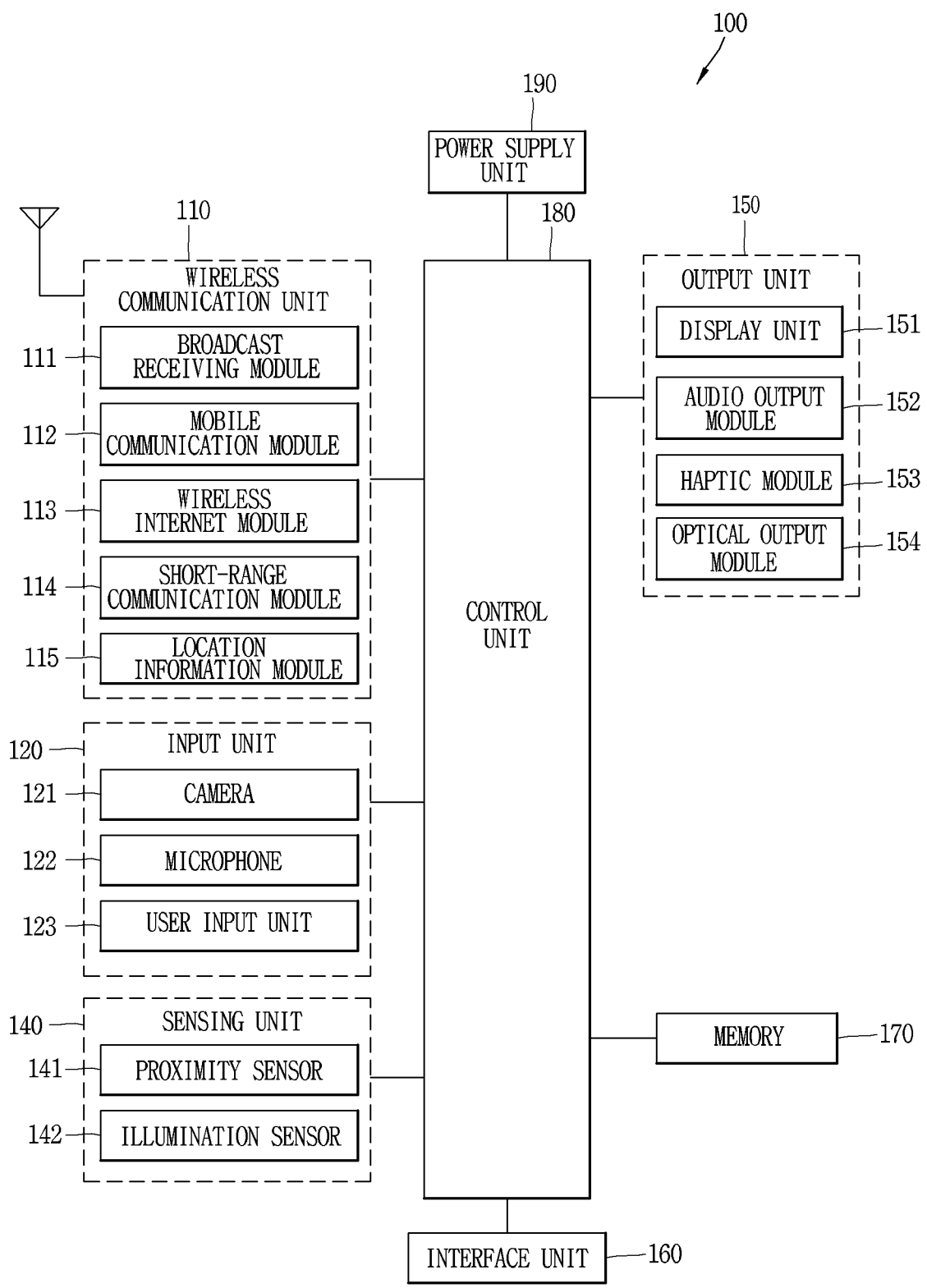
FIGS. 3A, 3B, and 3C are conceptual views illustrating one example of a mobile terminal in accordance with the present disclosure.
Figure 3B:
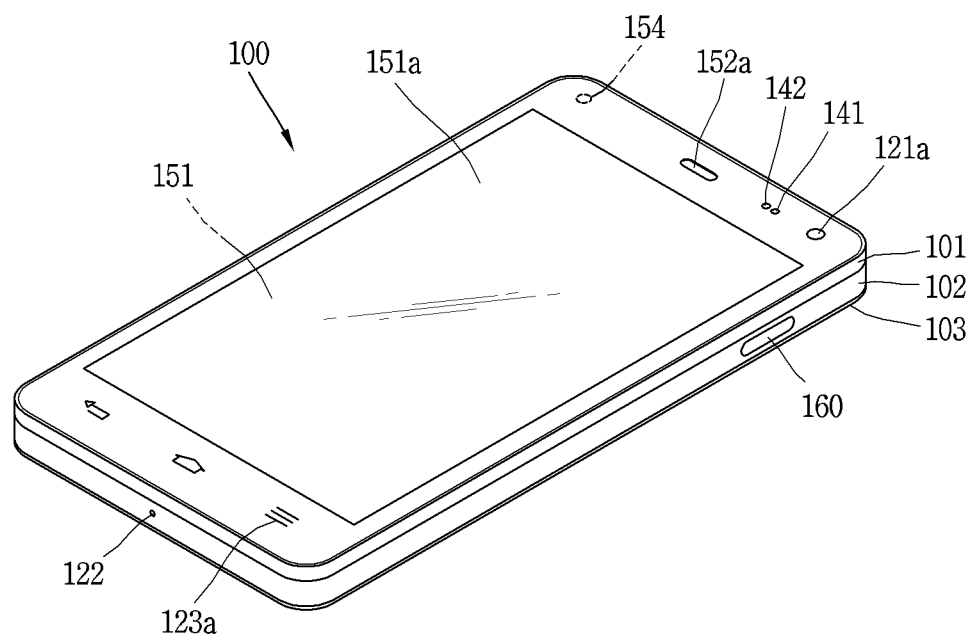
Figure 3C:
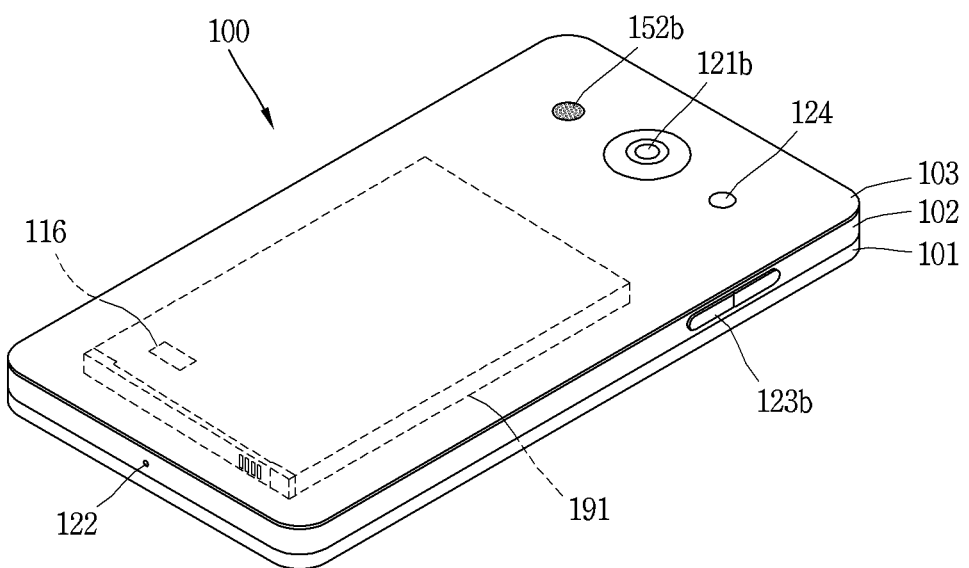

FIGS. 3A, 3B, and 3C are conceptual views illustrating one example of a mobile terminal in accordance with the present disclosure. The mobile terminal 100 according to the present disclosure may be coupled to the case of the electronic device described above.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Referring to FIGS. 3A to 3C, FIG. 3A is a block diagram of a mobile terminal in accordance with one exemplary implementation of the present disclosure, and FIGS. 3B and 3C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller (or control unit) 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions related to a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the control unit 180 to perform an operation (or function) for the mobile terminal 100.

The control unit 180 typically functions to control an overall operation of the mobile terminal 100, in addition to the operations associated with the application programs. The control unit 180 may provide or process information or functions appropriate for a user by processing signals, data, information and the like, which are input or output by the aforementioned various components, or activating application programs stored in the memory 170.

Also, the control unit 180 may control at least some of the components illustrated in FIG. 3A, to execute application programs that have been stored in the memory 170. In addition, the control unit 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various implementations disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various implementations implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some implementations, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 is for inputting image or video information (or signal), audio information (or signal), data, or user input. The mobile terminal 100 may include one or a plurality of cameras 121 through which such image information can be obtained. Such cameras 121 may process image frames of still pictures or video obtained by image sensors in a video or image capture mode. The processed image frames can be displayed on the display 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the control unit 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The control unit 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner area of the mobile terminal covered by the touch screen, or near the touch screen.

When the touch screen is implemented as a capacitance type, the proximity sensor 141 can sense proximity of a pointer relative to the touch screen by changes of an electromagnetic field, which is responsive to an approach of an object with conductivity. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which area of the display 151 has been touched. Here, the touch controller may be a component separate from the control unit 180, the control unit 180, and combinations thereof.

Meanwhile, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display 151 may be implemented as a stereoscopic display for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control operations relating to application programs and the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary implementations disclosed herein.

The power supply unit 190 receives external power or provides internal power and supply the appropriate power required for operating respective elements and components included in the HMD 100 under the control of the control unit 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various implementations described herein may be implemented in a computer-readable medium, a machine-readable medium, or similar medium using, for example, software, hardware, or any combination thereof.

Referring to FIGS. 3B and 3C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this implementation, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some implementations, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 3B and 3C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a control unit 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 151a and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit (123, see FIG. 3A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia reproduction request sounds.

The window 151a of the display unit 151 may include a sound hole for emitting sounds generated from the first audio output module 152a. However, the present invention is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the control unit 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 3A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 3A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Figure 4:
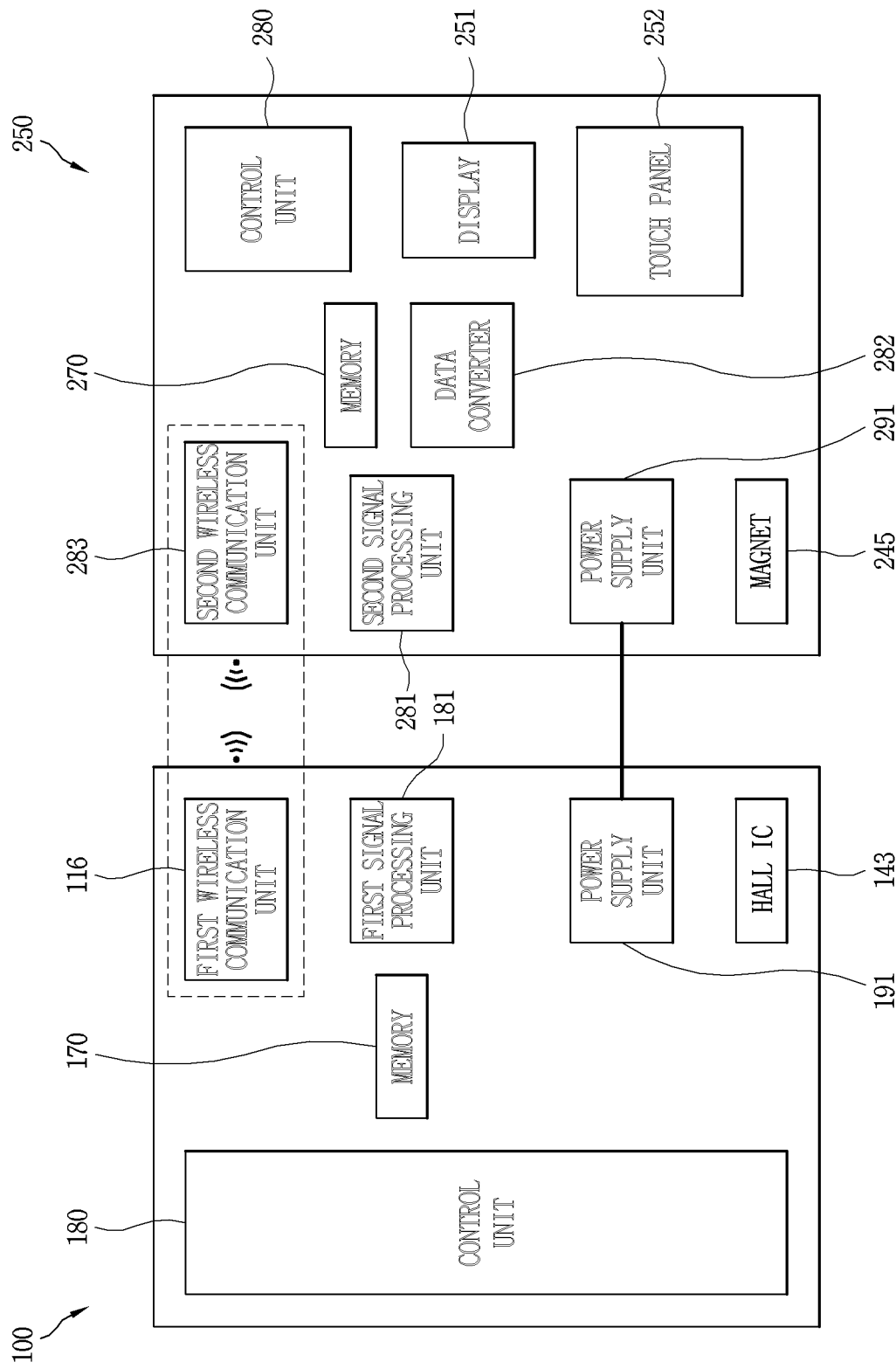
FIG. 4 is a conceptual view illustrating a control method between display units provided on a mobile terminal and a case in an electronic device in accordance with the present disclosure.

As described above, in the electronic device 300 according to the present disclosure, the first wireless communication unit 116 (refer to FIG. 3C) provided on the rear side of the mobile terminal and the second wireless communication unit 283 provided on the first body 210 of the case 200 may perform data communication with each other. Hereinafter, a method of performing data communication between the first and second wireless communication units 116 and 283 will be described in more detail with accompanying drawings. FIG. 4 is a conceptual view illustrating a control method between display units provided on a mobile terminal and a case in an electronic device in accordance with the present disclosure.

The mobile terminal 100 according to the present disclosure may be coupled to the first body 210. When the mobile terminal 100 is coupled to the first body 210, the first and second wireless communication units 116 and 283 may face each other.

The first wireless communication unit 116 provided in the mobile terminal 100 may be included in the wireless communication unit 110 described above with reference to FIG. 3A. The wireless communication unit 110 of the mobile terminal 100 may include a plurality of wireless communication parts, and the plurality of wireless communication parts may be respectively disposed at different positions on the mobile terminal 100. In particular, in the mobile terminal 100 according to the present disclosure, the first wireless communication unit 116 may be provided on the rear side of the mobile terminal 100. Accordingly, when the mobile terminal is coupled to the first body 210, the first wireless communication unit 116 may perform data communication with the second wireless communication unit 283 provided on the first body 210.

The first and second wireless communication units 116 and 283 according to the present disclosure may be provided with contactless connectors for data communication. The contactless connectors may be electromagnetic connectors that form electromagnetic communication links, and may be disposed on different devices to establish the electromagnetic communication links.

The first and second communication units 116 and 283 may include transceivers for converting electrical signals into electromagnetic (EM) signals. The transceiver of any one of the first and second communication units 116 and 283 may convert electrical signals into EM signals. These EM signals may be received by another transceiver, which may convert the EM signals into the electrical signals.

Meanwhile, in the present disclosure, the term "transceiver" may refer to a device such as an integrated circuit (IC) including a transmitter Tx and a receiver Rx that are used for transmitting and receiving information (data). In general, a transceiver may be operable in a half-duplex mode (alternating transmission and reception) and a full-duplex mode (simultaneous transmission and reception), or may be configured as either a transmitter or a receiver. The transceiver may include separate integrated circuits for a transmitting function and a receiving function. The terms "contactless", "coupled pair" and "proximity coupling", as used herein, refer to implementing electromagnetic (EM) connection and signal transfer rather than electrical (wired, contact-based) connection and signal transfer between the first and second wireless communications units 116 and 283.

As used herein, the term "contactless type" may refer to a carrier-assisted, dielectric coupling system that may have an optimal range in the range of 0 to 5 centimeters. The connection may be verified by proximity of one of the first and second wireless communication units 116 and 283 with respect to the other. A plurality of contactless transmitters and receivers may occupy a small space. Electromagnetically established contactless links may be point-to-point type links, unlike wireless links that typically broadcast to several points.

The first and second communication units 116 and 283 may establish a wireless connection to transmit data from one location to another, or may establish a point-to-point contactless communication link that or coupled-pair which does not require a physical wired connection. Transceivers may be extremely high frequency (EHF) transceivers.

For example, when the mobile terminal 100 is coupled to the first body 210, the first wireless communication unit 116 of the mobile terminal 100 and the second wireless communication unit 283 of the first body 210 may face each other within a preset distance. Accordingly, a contactless communication link may be established between the first and second wireless communication units 116 and 283.

Data transmission between the mobile terminal 100 and the second display unit 250 may be performed through the EHF transceivers included in the first and second wireless communication units 116 and 283, respectively.

The second wireless communication unit 283, namely, the EHF transceiver that transmits and receives data for the second display unit 250 may be provided on the first body 210, as illustrated in FIGS. 2A, 2B, and 2C.

The second wireless communication unit 283 provided on the first body 210 may perform data transmission and reception in a wired manner with the second display unit 250 through the wiring part 242 included in the connecting portion 230.

Meanwhile, as described above, as the mobile terminal 100 is coupled to the first body 210, the EHF transceivers included in the first and second wireless communication units 116 and 283, respectively, may be coupled to each other through proximity coupling.

The EHF transceiver pair coupling between the first and second wireless communication units 116 and 283 may provide a contactless data path, passage, or channel. In some implementations, data paths are unidirectional (e.g., data flow from the mobile terminal 100 to the second display unit 250 through a specified passage) or bidirectional (e.g., bidirectional data flow between the mobile terminal 100 and the second display unit 250 through a specified passage).

The first and second wireless communication units 116 and 283 according to the present disclosure may be configured to transmit and receive various types of data. For example, the data may be one of graphic data, audio data, video data, touch event data, and a combination thereof.

On the other hand, the second display unit 250 provided on the second body 220 may be operated by power supplied from the mobile terminal 100.

At this time, as described above, power may be supplied to the second display unit through an electrical connection path defined by the first circuit board 243 electrically connected to the mobile terminal 100, the wiring part 242 provided in the connecting portion 230, and the second circuit board provided in the second body 220.

That is, as illustrated in FIG. 4, a power supply unit 191 of the mobile terminal 100 may supply an operating current (or power) to a power supply unit 291 of the second display unit 250 through the electrical connection path defined by the first circuit board 243, the wiring part 242 provided in the connecting portion, and the second circuit board 244 of the second body 220.

On the other hand, as aforementioned, the mobile terminal 100 may be detachably coupled to the first body 210. In addition, the mobile terminal may be configured to detect whether it is coupled to the first body 210. For the detection, the first body 210 may include a magnet 245 (see FIG. 4) on one surface facing the mobile terminal 100. The mobile terminal 100 may include a hall sensor 143 (see FIG. 4) disposed on its rear side to sense a magnetic field corresponding to the magnet 245 when the body of the mobile terminal is coupled to the first body 210. When the magnetic field is sensed by the hall sensor, the mobile terminal may recognize that it has been coupled to the case and perform a preset control.

For example, when the magnetic field is sensed by the hall sensor 143, a control unit 180 of the mobile terminal 100 may control a power supply unit 190 to supply an operating current to the second display unit 250 disposed on the second body 220.

That is, the second display unit 250 provided on the second body 220 may be operated by power supplied from the mobile terminal 100.

In this way, when the operating current is supplied to the second display unit 250, the system of the second display unit 250 may be booted up and initialized, and may be in an operable standby state.

At this time, the second display unit 250 may have any one of an active state and an inactive state. Even in the inactive state of the second display unit 250, a touch sensor (or touch panel) 252 provided on the second display unit 250 may be activated so as to detect a touch applied to the second display unit 250.

On the other hand, when the second display unit 250 is activated, the mobile terminal 100 may transmit screen information (digital image information) to be output to the display 251 provided on the second display unit 250 through the first wireless communication unit 116. At this time, as described above, the digital image signal may be transmitted as a signal of a frequency band of 60 GHz wirelessly through a wireless connector.

As described above, the second display unit 250 may receive data (e.g., a digital image signal, and the like) from the first wireless communication unit 116 through the second wireless communication unit 283 and the second circuit board 244. In this case, the digital image signal may be converted into a format that can be output to the second display unit 250 through a data converter 282. For example, the second display unit 250 may be implemented as an LCD panel. At this time, the digital image signal in a DP format, received from the mobile terminal 100, may be converted into a data format (MIPI format) that the LCD panel can receive through the data converter 282, and transmitted and output to the display 251.

Meanwhile, types of data transmitted and received through the first and second wireless communication units 116 and 283 may be preset. For example, only data corresponding to image signals may be transmitted and received through the first and second wireless communication units 116 and 283.

At this time, signals such as a communication control signal, a touch signal, and a brightness control signal, which are required to be transmitted between the mobile terminal 100 and the second display unit 250, except for the image signal, may be transmitted and received sequentially via multiple input channels, first and second signal processing units 181 and 281, the first circuit board 243, and the power terminal (e.g., the pogo-pin) 249. Meanwhile, the initialization of the second display unit 250 may be controlled by a controller included in the second display unit 250.

Hereinafter, a screen control method between the first display unit provided in the mobile terminal and the second display unit provided in the case in the electronic device 300 according to the present disclosure will be described in more detail with reference to FIGS. 5A to 5F.

Figure 5A:
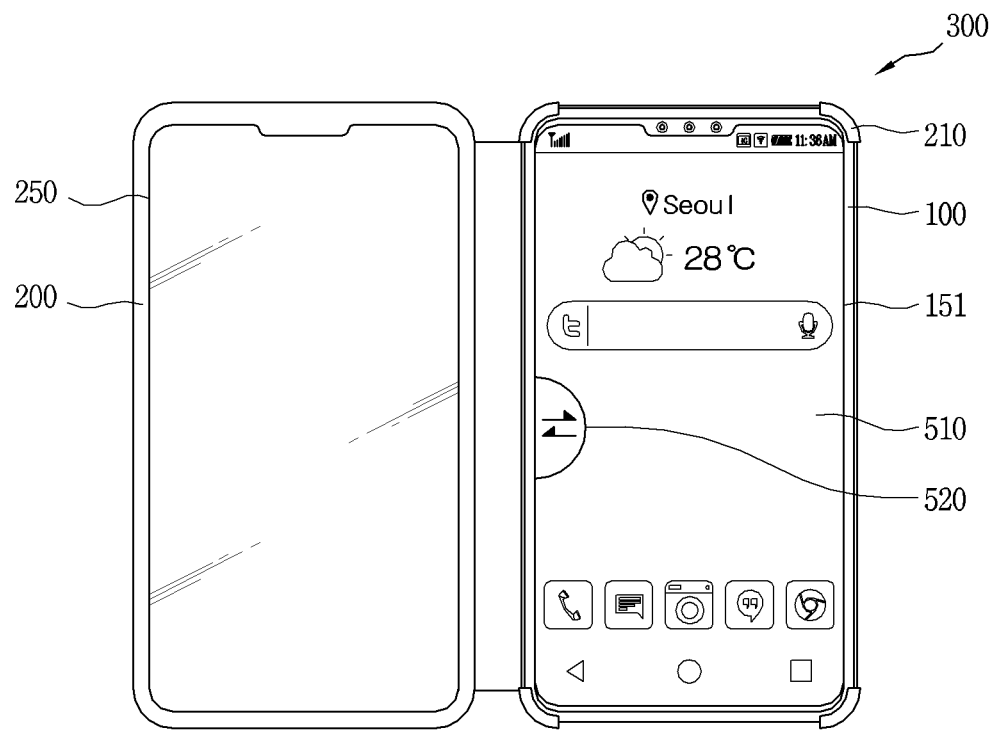

In FIG. 5A, the first display unit 151 provided in the mobile terminal 100 may be in an active state, and the second display unit 250 provided in the case 200 may be in an inactive state.

In one example, when the electronic device 300 is switched from a closed state to an open state, the first display unit 151 may be switched to an active state, and for example, a home screen 510 may be output.

When the electronic device 300 is switched from the closed state to the open state, an operating current may be supplied to the second display unit 250 but may be maintained in the inactive state until an input is applied. Here, the input may be applied to wake the second display unit 250 up, and for example, may be a touch input (e.g., a tap/double tap, hereinafter 'knock-knock function') applied to the second display unit 250.

When a touch input is applied to the second display unit 250, a touch signal corresponding to the touch input may be transmitted to the first wireless communication unit 116 through the second wireless communication unit 283 (FIG. 4). Then, the control unit 180 of the mobile terminal may determine whether the touch signal received through the first wireless communication unit corresponds to a preset type of touch. As a result of the determination, when the touch signal is the preset type of touch (e.g., a tap/double tap), the control unit may generate a control signal for switching the second display unit 250 to an active state and transmit the control signal to the second display unit 250 through the first wireless communication unit 116 and the second wireless communication unit 283.

Meanwhile, in another example, when the electronic device 300 is switched from a closed state to an open state, both the first display unit 151 and the second display unit 250 may be in an active state. In this case, for example, a first home screen may be output to the first display unit 151 and a second home screen different from the first home screen or a predetermined screen may be output to the second display unit 250.

On the other hand, an icon 520 that indicates hidden menus related to the control of the second display unit 250 may be displayed on one area, for example, an edge area of the home screen 510 output on the first display unit 151. The icon 520 may be moved to a different position or may be hidden 151, in response to a drag touch input.

The control unit of the mobile terminal 100 may display hidden menus on the first display unit 151 based on a touch input applied to the displayed icon 520. An image (→) guiding a drag direction of a touch input for displaying the hidden menus may be displayed on the icon 520.

For example, as illustrated in FIG. 5B, in a state where the home screen 510 is output to the first display unit 151 and an execution screen 530 of a web application is output to the second display unit 250, when a touch input applied to the icon 520 of the home screen 510 is dragged from the edge area toward a center of the first display unit 151, the hidden menus may be displayed.

The displayed menus may provide various functions for interoperably controlling the first display unit 151 and the second display unit 250 based on an input to the first display unit 151. For example, as illustrated in FIG. 5B, a screen switching menu 521, a screen sending menu 522, a screen importing menu 523, a main screen power saving menu 524, and a dual screen-off menu 525 may be provided. However, the present disclosure may not be limited to the illustrated examples, and more other menus may be displayed.

FIGS. 5C to 5F specifically illustrate various functions for cooperatively controlling the first display unit 151 and the second display unit 250 based on a touch input applied to a menu displayed on the first display unit 151.

Hereinafter, FIG. 5C illustrates an operation corresponding to a switching function between a screen displayed on the first display unit 151 to a screen displayed on the second display unit 250.

Referring to FIG. 5C, first screen information, for example, a home screen 510 may be output to the first display unit 151 and second screen information, for example, an execution screen 530 of a web application may be output to the second display unit 250.

As described above, in a state where different pieces of screen information are output to the first display unit 151 and the second display unit 250, when a touch input is applied to the screen switching menu 521 among the menus displayed on the first display unit 151, the home screen 510 being output on the first display unit 151 may move to the second display unit 250. At the same time, the execution screen 530 being output on the second display unit 250 may move to the first display unit 151.

To this end, the control unit of the mobile terminal 100 may move a task corresponding to the home screen 510 output on the first display unit 151 to a memory stack allocated for the second display unit 250. In addition, the control unit of the mobile terminal 100 may move a task corresponding to the execution screen 530 output on the second display unit 250 to a memory stack allocated for the first display unit 151.

In this way, after the screen switching between the first display unit 151 and the second display unit 250, when an input for displaying the hidden menus again is applied and the screen switching menu 521 is selected, the screens may be restored to their original states.

To this end, the control unit of the mobile terminal 100 may move the most recently input task in the memory stack allocated for the second display unit 250 back to the memory stack for the first display unit 151. At the same time, the control unit of the mobile terminal 100 may move the most recently input task in the memory stack for the first display unit 151 to the memory stack allocated for the second display unit 250.

Meanwhile, although not shown, when the screen sending menu 522 is selected on the first display unit 151, only the screen being output on the first display unit 151 may be moved to the second display unit 250.

To this end, the control unit of the mobile terminal 100 may move a task corresponding to the screen being output on the first display unit 151 to the memory stack allocated for the second display unit 250. In this case, a screen corresponding to the next task of the memory stack for the first display unit 151 may be output to the first display unit 151. At this time, if there is no next task, the home screen may be output.

The screen importing menu 523 of the first display unit 151 may be activated when the second display unit 250 is in an active state and at least the screen sending menu 522 has been executed.

When the screen importing menu 523 is selected in a state that such conditions are satisfied, the screen which has been output on the first display unit 151 and is currently output on the second display unit 250 may be displayed back on the first display unit 151. In addition, the screen that has been output on the second display unit 250 before the screen of the first display unit 151 is imported may appear back on the second display unit 250.

To this end, the control unit of the mobile terminal 100 may move a task corresponding to the screen output on the second display unit 151 to the memory stack allocated for the first display unit 151.

Hereinafter, FIG. 5D illustrates an operation corresponding to a function of switching only a screen displayed on the first display unit 151 to a power saving mode.

When a touch input is applied to the main screen power saving menu 524 among the menus displayed on the first display unit 151, a control signal corresponding to the touch signal corresponding to the corresponding menu may be generated to execute a power saving mode for the first display unit 151.

At this time, since only the first display unit 151 is executed in the power saving mode, an image signal corresponding to screen information output on the second display unit 250 may continuously be transmitted from the mobile terminal 100 to the second display unit 250 through the first and second wireless communication units 116 and 283.

In response to the execution of the power saving mode for the first display unit 151, brightness of the home screen 510 of the first display unit 151 may be adjusted darkly as illustrated in FIG. 5D. On the other hand, the execution screen 530 of the second display unit 250 may be maintained in previous brightness.

Hereinafter, FIGS. 5E and 5F illustrate operations corresponding to a function of controlling the second display unit 250 to be turned on/off by using a touch input to the first display unit 151.

First, referring to FIG. 5E, when the dual screen-off menu 525 displayed on the first display unit 151 is selected, the control unit 180 of the mobile terminal may transfer a control signal for switching the second display unit 250 to an inactive state to the second display unit 250 through the first wireless communication unit 166 and the second wireless communication unit 283. Accordingly, as illustrated in FIG. 5E below, the second display unit 250 may be switched to an inactive state.

Then, the icon (hereinafter, 'first icon') 520 indicating that there are hidden menus displayed on the first display unit 151 may be switched to another icon (hereinafter 'second icon') 520' indicating a locked state.

As described above, as the second display unit 250 is switched to an inactive state based on the input to the first display unit 151, an operating current which is supplied from the mobile terminal 100 to the second display unit 250 may not be supplied any more.

However, when a memory stack for screen information output on the second display unit 250 is allocated to the mobile terminal 100, the mobile terminal 100 may recognize the task corresponding to the screen information output on the second display unit 250.

In this way, after the dual screen-off menu 525 is selected, as illustrated in FIG. 5F, when a touch input applied to the second icon 520' is dragged in a predetermined direction, for example, toward a center of the edge area of the first display unit 151, only a dual screen-on menu 525' may be displayed.

When a touch input is applied to the dual screen-on menu 525', the control unit 180 of the mobile terminal may transmit a control signal for switching the second display unit 250 to an active state to the second display unit 250 through the first wireless communication unit 166 and the second wireless communication unit 283. Then, the operating current may be supplied from the mobile terminal 100 to the second display unit 250 again.

In this case, the screen information 530 that was output immediately before switching to the inactive state may be output again to the second display unit 250. To this end, the control unit 180 of the mobile terminal may control states tasks of the memory stack allocated for the second display unit 250 to be maintained. In another example, unlike FIG. 5F, a home screen may be output to the second display unit 250 switched to the active state.

As such, when the second display unit 250 is turned on, the second icon 520' displayed on the first display unit 151 may be switched to the first icon 520 indicating that there are the hidden menus.

On the other hand, instead of using the icon 520, a first screen displayed on the first display unit 151 may be sent to the second display unit 250 or a second screen displayed on the second display unit 250 may be sent to the first display unit 151 using a preset touch gesture. Here, the preset touch gesture may be a multi-finger touch gesture.

For example, as illustrated in FIG. 5G, in a state where first screen information 540 is displayed on the first display unit 151 and second screen information 530 is displayed on the second display unit 250, when a three-finger touch gesture applied to the second display unit 250 is dragged toward the first display unit 151, the second screen information 530 displayed on the second display unit 250 may be sent to the first display unit 151. In other words, a task of the memory stack allocated for the second display unit 250 may move to the memory stack for the first display unit 151.

Accordingly, an application corresponding to the first screen information 540 displayed on the first display unit 151 may be located on a background and the second screen information 530 may be displayed on the first display unit 151. In addition, a screen of an application which is currently executed on the background or a home screen 531 may be displayed on the second display unit 250.

Similarly, as illustrated in FIG. 5h, in a state where the first screen information 540 is displayed on the first display unit 151 and the second screen information 530 is displayed on the second display unit 250, when a three-finger touch gesture applied to the first display unit 151 is dragged toward the second display unit 250, the first screen information 540 displayed on the first display unit 151 may be sent to the second display unit 250. In this case, a task of the memory stack allocated for the first display unit 151 may move to the memory stack for the second display unit 250.

Accordingly, an application corresponding to the second screen information 530 displayed on the second display unit 250 may be located on a background and the second screen information 530 may be displayed on the second display unit 250. In addition, a screen of an application which is currently executed on the background or a home screen may be displayed on the first display unit 151.

Meanwhile, the electronic device 300 according to the present disclosure can use various camera functions related to a preview screen more efficiently using the second display unit 250 of the case while the preview screen is displayed on the first display unit 151 in response to an activation of a camera.

Hereinafter, an exemplary operation of a control method of an electronic device according to the present disclosure will be described in more detail with reference to FIG. 6.

Referring to FIG. 6, in the electronic device according to the present disclosure, the control unit 180 of the mobile terminal may recognize a state in which first screen information is displayed on the second display unit 250 of the case and a preview screen output in response to an activation of a camera is displayed on the first display unit 151 of the mobile terminal (S10).

To this end, both the first and second display units 151 and 250 may be maintained in an active state. Also, the type of the first screen information may not be limited at all.

Also, the camera may be either a front camera 121a or a rear camera 121b provided on the mobile terminal. In this regard, referring back to FIG. 1A, in the electronic device according to the present disclosure, the mobile terminal coupled to the first body 210 may include the front camera 121a having a plurality of camera lenses L1, L2, and L3 disposed on an upper end of a front surface. The plurality of camera lenses L1, L2, and L3 may be selectively operated. In addition, the plurality of camera lenses L1, L2, and L3 may include a telephoto lens, a normal angle lens, and a wide angle lens, and may be configured with fewer or greater than those three camera lenses L1, L2, and L3. The camera may also be activated (operated) by the control unit 180 in response to an execution of a camera application.

As described above, in the state in which the preview screen in response to the activation of the camera is displayed on the first display unit 151, the control unit 180 may detect a preset touch input received on the first display unit 151 (S20).

Here, the preset touch input may be defined as a touch point of a touch input applied to the first display unit 151 or a touch type of the touch input is a preset position or a preset type.

For example, the preset touch input may refer to a touch input that a touch point of the touch input applied to the first display unit 151 is located in a predetermined area or on a specific icon. Also, for example, the preset touch input may be a preset touch gesture (e.g., a double tap, a long touch input, etc.) applied to a specific icon of the first display unit 151.

The preset touch input may also be defined as an input/request for executing a predetermined camera function related to the preview screen displayed on the first display unit 151. In this case, the preset touch input may be modified into another input method such as a voice command or a user gesture.

As described above, when the preset touch input is applied while the preview screen is displayed on the first display unit 151, the control unit 180 of the mobile terminal may execute an expanded preview mode for utilizing the second display unit 250.

The expanded preview mode may be defined as an operation mode for performing a camera function related to the preview screen of the first display unit 151 by using the second display unit 250.

According to the execution of the expanded preview mode, the control unit 180 may generate a control signal for displaying second screen information corresponding to the camera function related to the preview screen on the second display unit 250. Then, the control unit 180 may transmit the control signal to the second display unit 250 through the wiring part 242 connected to the case and the second wireless communication unit 283 connected to the wiring part 242 (S30).

In other words, according to the entry of the expanded preview mode, the second display unit 250 may be used as an area related to a camera function of a capturing mode performed on the first display unit 151. To this end, the second screen information may be used as an auxiliary screen of a camera function applied/to be applied to the preview screen displayed on the first display unit 151.

Next, according to the control signal, the first screen information displayed on the second display unit 250 may be changed to the second screen information while the display state of the preview screen of the first display unit 151 is maintained (S40).

Specifically, a task of an application corresponding to the second screen information may be stored in the memory stack allocated for the second display unit 250. Accordingly, the application corresponding to the first screen information may move to a background of the second display unit 250 and the second screen may be displayed on the second display unit 250.

Hereinafter, each process of FIG. 6 will be described in more detail with reference to FIGS. 7A to 7D.

Figure 7A:
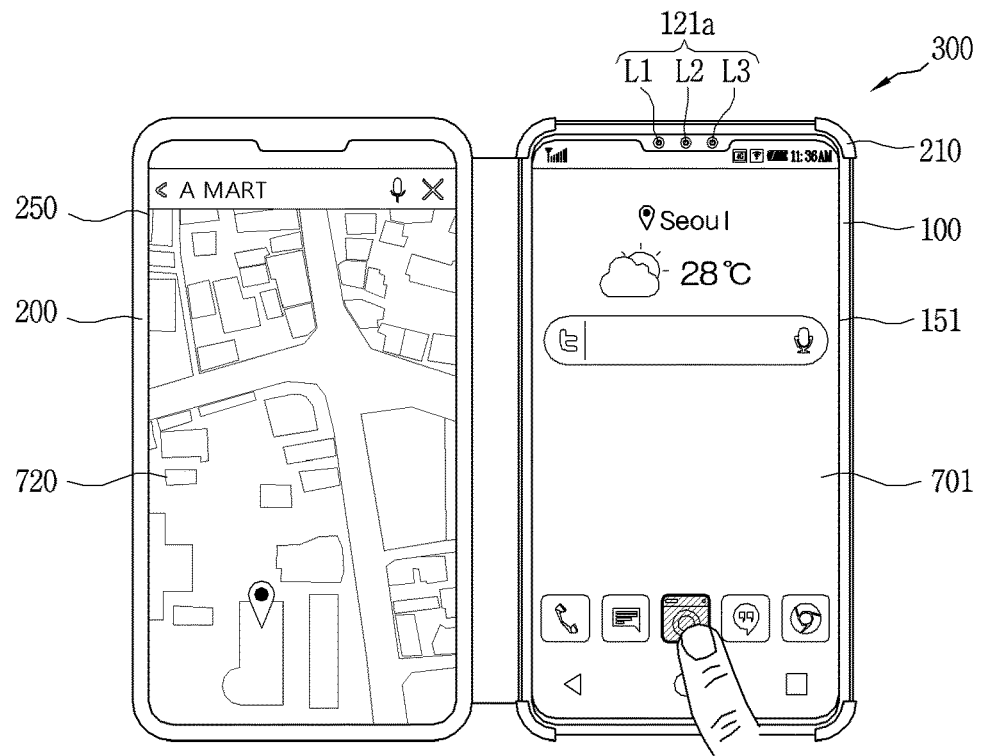
FIGS. 7A, 7B, 7C, and 7D are exemplary conceptual views related to the operation processes of FIG. 6.

First, referring to FIG. 7A, in an active state of the first and second display units 151 and 250, a home screen 701 may be output on the first display unit 151 and an execution screen (hereinafter, 'first screen information') of, for example, a map application may be output on the second display unit 250.

Figure 7B:
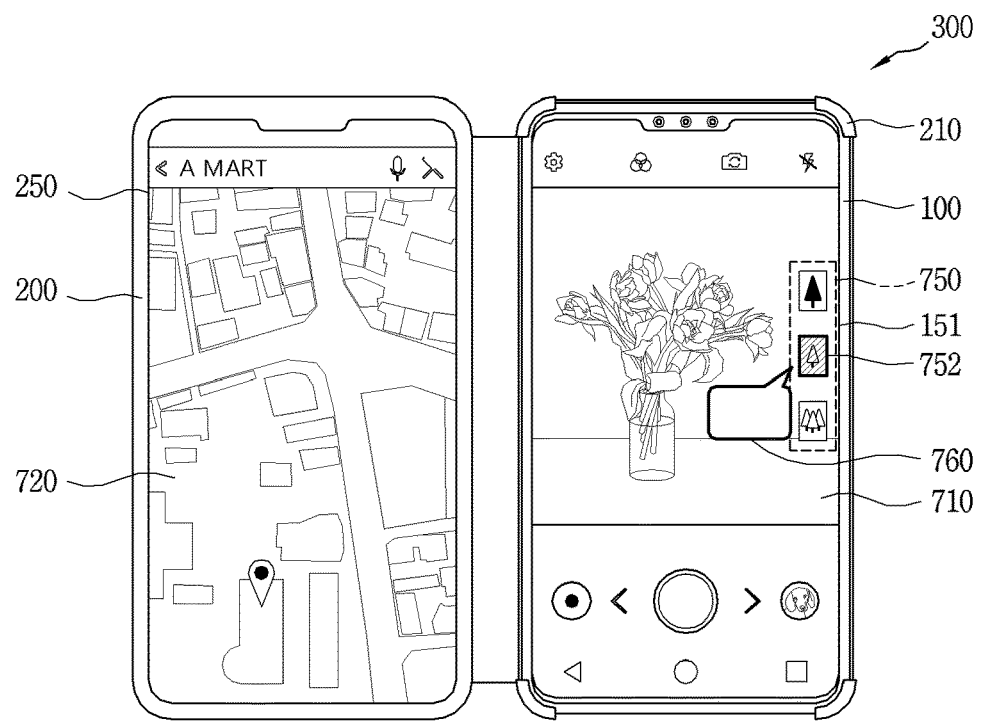

A camera application may be executed using an icon/widget on the home screen 701 of the first display unit 151. When a camera disposed on the mobile terminal 100 is operated in response to the execution of the camera application, a preview screen 710 (hereinafter, referred to as 'preview screen') corresponding to the execution of the camera application on the first display unit 151, as illustrated in FIG. 7B.

At this time, an icon area 750 for selectively applying a plurality of camera angles of view corresponding to a plurality of lenses L1, L2, and L3 disposed on the front surface of the mobile terminal may be displayed on the preview screen 710, and each icon (e.g., 752) corresponding to each camera angle of view may be displayed in the icon area 750.

When a proximity touch is applied to a specific icon 752 in the icon area 750, the control unit 180 may pop up guide information 760 for informing a camera angle of view (e.g., a telephoto angle, a normal angle, and a wide angle) that matches the icon 752. And, when a touch is applied to the corresponding icon 752, the control unit 180 may switch a currently applied lens (e.g., L1) to another lens having a different angle of view that matches the corresponding icon 752.

Figure 7C:
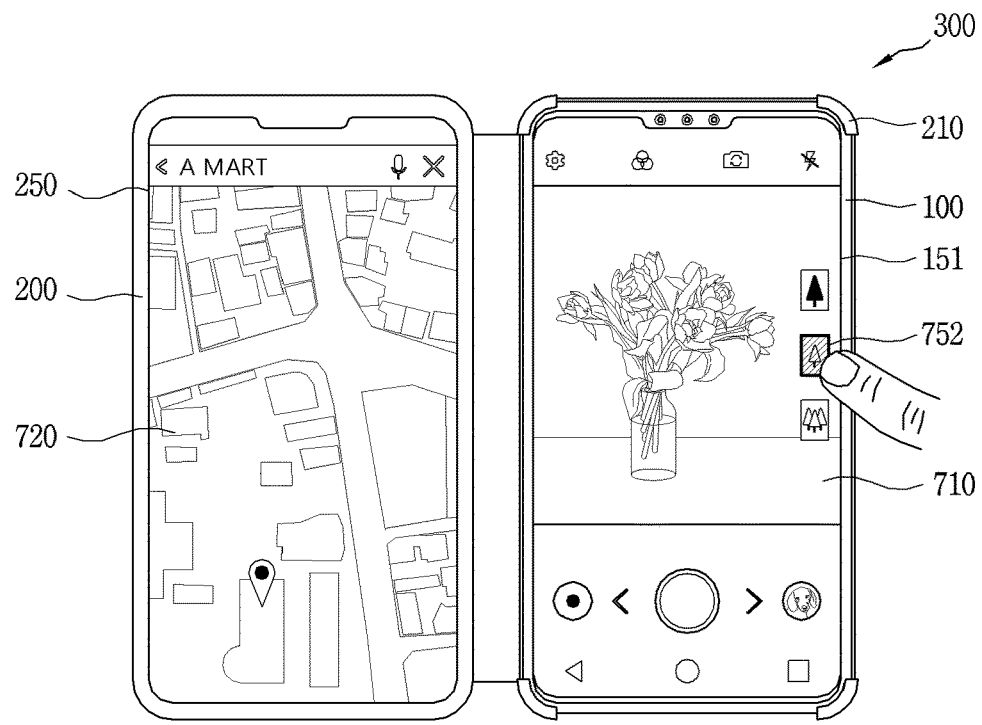

In FIG. 7C, in response to a preset touch input, for example, a long touch input being applied to the specific icon 752, the control unit 180 may operate to enter the expanded preview mode.

Figure 7D:
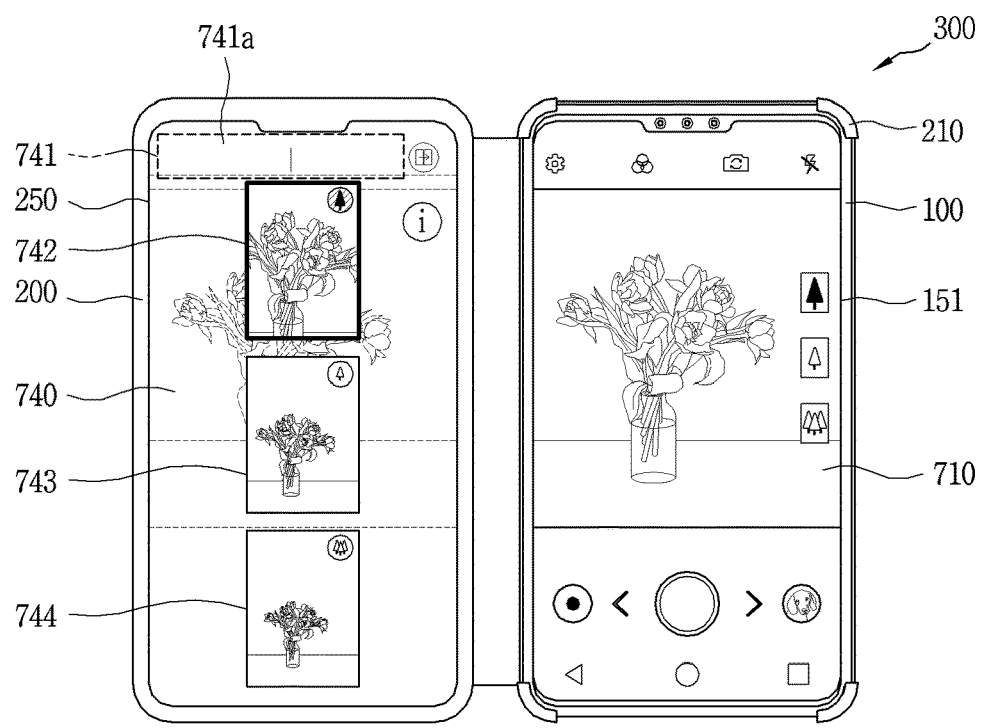

Accordingly, as illustrated in FIG. 7D, sub preview screens to which the camera angles of view matching respective icons displayed in the icon area 750 are actually applied may be displayed as second screen information 740 on the second screen information 740. That is, the first screen information 720 displayed on the second display unit 250 may be switched to the second screen information 740.

In the first display unit 151, even if the angle of view of the displayed preview screen 710 is changed, the changed angle of view is not reflected to the preview screen 710. Accordingly, the user had to check an actual image, to which a selected angle of view was applied, only after performing a process of capturing the preview screen 710 and selecting a captured image view or a stored image view.

However, in the present disclosure, as illustrated in FIG. 7D, images to which different angles of view are applied can be immediately checked and compared through the sub preview screens 742, 743, and 744 of the second display unit 250.

In this case, while the second screen information 740 is displayed, the control unit 180 may synchronize the preview screen 710 displayed on the first display unit 151 with images of the sub preview screens 742, 743, and 744 displayed on the second display unit 250. Accordingly, when the image of the preview screen 710 changes due to movement of the electronic device 300 or movement of an object to be captured, the images of the sub preview screens 742, 743, and 744 displayed on the second display unit 250 may be synchronized accordingly.

As described above, in the present disclosure, the sub preview screens to which the plurality of angles of view are applied can be previewed on a larger screen while maintaining the size of the preview screen displayed on the first display unit 151.

In this state, the control unit 180 may switch a camera lens to be applied to the preview screen 710 based on an input applied to the icon area 750 displayed on the first display unit 151. Alternatively, the control unit 180 may switch a camera lens to be applied to the preview screen 710 based on the selection of the plurality of sub preview screens 742, 743, and 744 displayed on the second display unit 250.

Specifically, the control unit 180 may receive a touch signal of a touch input applied to any one of the plurality of sub preview screens from the second display unit 250, and select a camera angle of view that matches the received touch signal.

Then, the control unit 180 may control the plurality of lenses L1, L2, and L3 provided in the mobile terminal 100 to be switched to a lens corresponding to a determined angle of view.

The control unit 180 may apply a camera angle of view corresponding to the switched lens to the preview screen of the first display unit 151. At this time, a graphic object (e.g., a selected image) indicating the applied camera angle of view may be displayed on one sub preview screen to which the touch input has been applied.

In detail, the control unit 180 may receive a touch signal of a touch input for changing the angle of view, applied to the icon area 750, from the first display unit 151, and control the plurality of lenses L1, L2, and L3 to be changed to a camera angle of view that matches the received touch signal. Then, the control unit 180 may apply the changed angle of view to the preview screen of the first display unit 151.

In this case, the control unit 180 may control the second display unit 250 to display the graphic object on a sub preview screen that matches the changed angle of view. In other words, the control unit 180 may transmit a control signal for displaying the graphic object on the matched sub preview screen to the second display unit 250 through the wiring part 242 and the second wireless communication unit 283.

As described above, in the present disclosure, while the preview image of the camera is displayed through the first display unit 151, screens for applying multiple lenses applicable to the preview image may be previewed at once through the second display unit 250. Accordingly, the sub preview screens to which the plurality of angles of view are applied can be viewed on a larger screen using the second display unit 250 while maintaining the size of the displayed preview screen, whereby improvement of usability of functions can be expected.

Hereinafter, various implementations related to camera functions to be applied to the preview image using the second display unit 250 while the preview image is displayed on the first display unit 151 will be described in detail, with reference to FIGS. 8A, 8B, 8C, 8D, 8E, 9A, 9B, 10A, 10B, 100, 10D, 11A, 11B, 12A, 12B, 12C, 13A, 13B, and 13C.

First, a method of checking a preview screen in a large size, to which a changed angle of view is actually applied, and capturing the preview screen while viewing it in an expanded preview mode will be described with reference to FIGS. 8A, 8B, 8C, 8D, and 8E.

Figure 8A:
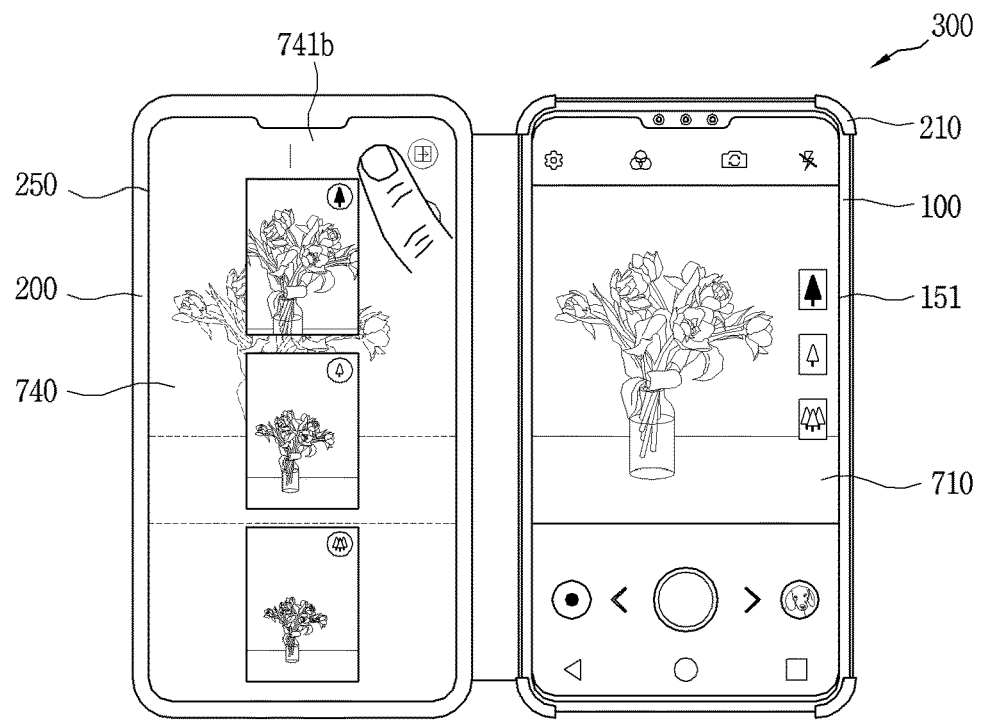

Referring to FIG. 8A, as the expanded preview mode is executed, sub preview images having a plurality of angles of view, which match the plurality of lenses, may be displayed as the second screen information on the second display unit 250 while the preview screen 710 is displayed on the first display unit 151.

At this time, when a touch input is applied to a menu 741b, which is disposed in a predetermined area, for example, an upper end area of the second screen information 740 for capturing the sub preview images of the second display unit 250, to which a camera angle of view has been actually applied, the control unit 180 may control the second display unit 250 to display third screen information 810 (FIG. 8C), on which one of the plurality of sub preview images included in the second screen information 740 is expanded to the entire second display unit 250. This may be defined as a 'mirror mode' has been executed.

In this case, any one of the plurality of sub preview screens may be defined as a sub preview image that matches a selected angle of view. Referring to FIG. 8C, a capturing icon 811 for photographing the displayed sub preview screen may be displayed on the third screen information 810.

The user can perform photographing (capturing) by applying a touch to the capturing icon 811 displayed on the third screen information 810. In other words, the user can take a picture while looking at the preview screen that is the same as the preview screen displayed on the first display unit 151 and to which the selected angle of view has been actually applied. Accordingly, since the user does not have to view alternately the second display unit 250 for checking the sub preview images, to which the selected angle of view has actually been applied, and the first display unit 151 on which the capturing is actually carried out, the user can more concentrate on a subject to capture.

Figure 8B:
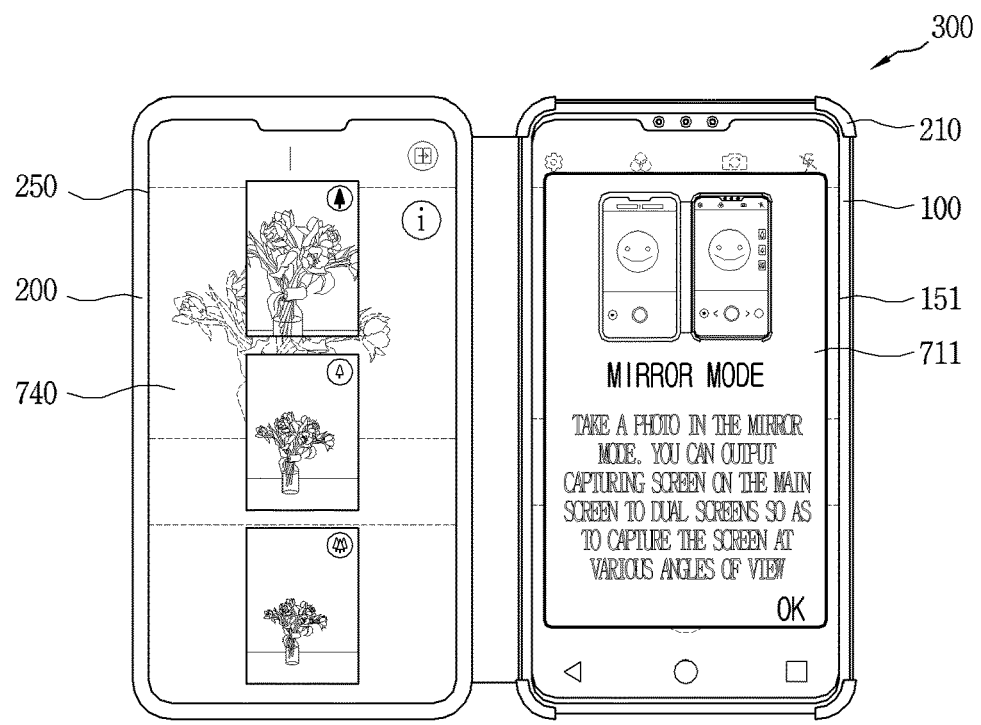
Figure 8C:
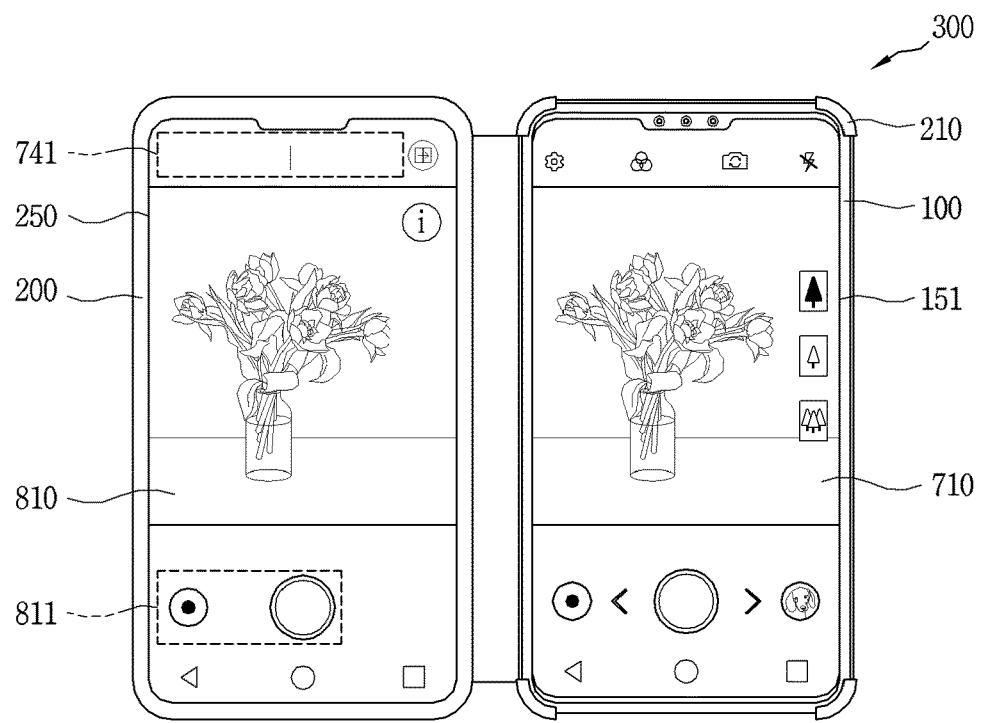

Also, in one example, as illustrated in FIG. 8B, when a touch input is applied to a predetermined area 741b of the second screen information 740 displayed on the second display unit 250, guide information 711 informing that capturing can be performed on the second display unit using the third screen information later (execution of a 'mirror mode') may be popped up on the preview screen of the first display unit 151.

The guide information 711 may not be output when the second display unit 250 is switched to an inactive state. The guide information 711 may disappear when a predetermined time elapses or there is an acknowledgment.

Figure 8D:
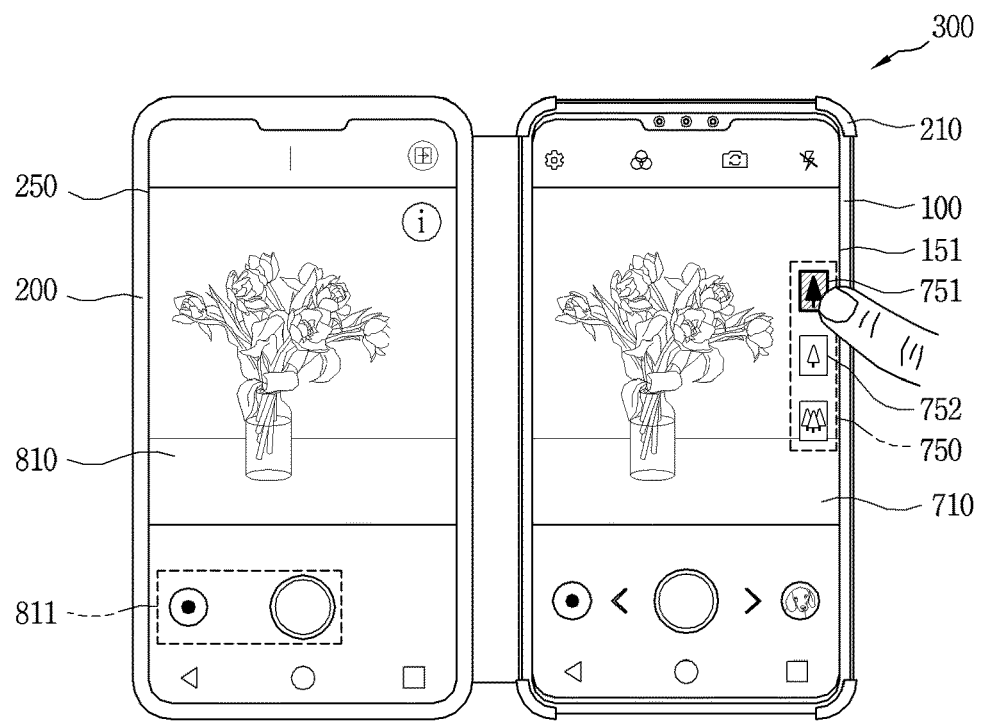

Also, in an implementation, in the state in which the mirror mode has been executed, as illustrated in FIG. 8D, a camera angle of view for a subject to be captured may change differently based on a touch input applied to the icon area 750 displayed on the first display unit 151.

For example, when icons 751 and 752 corresponding to a telephoto angle, a normal angle, and a wide angle matching the plurality of lenses L1, L2, and L3 are displayed in the icon area 750 and a currently applied camera angle of view is the normal angle, a first preview screen 710 displayed on the first display unit 151 and a second preview screen 810 displayed on the second display unit 250 may be the same as each other.

Figure 8E:
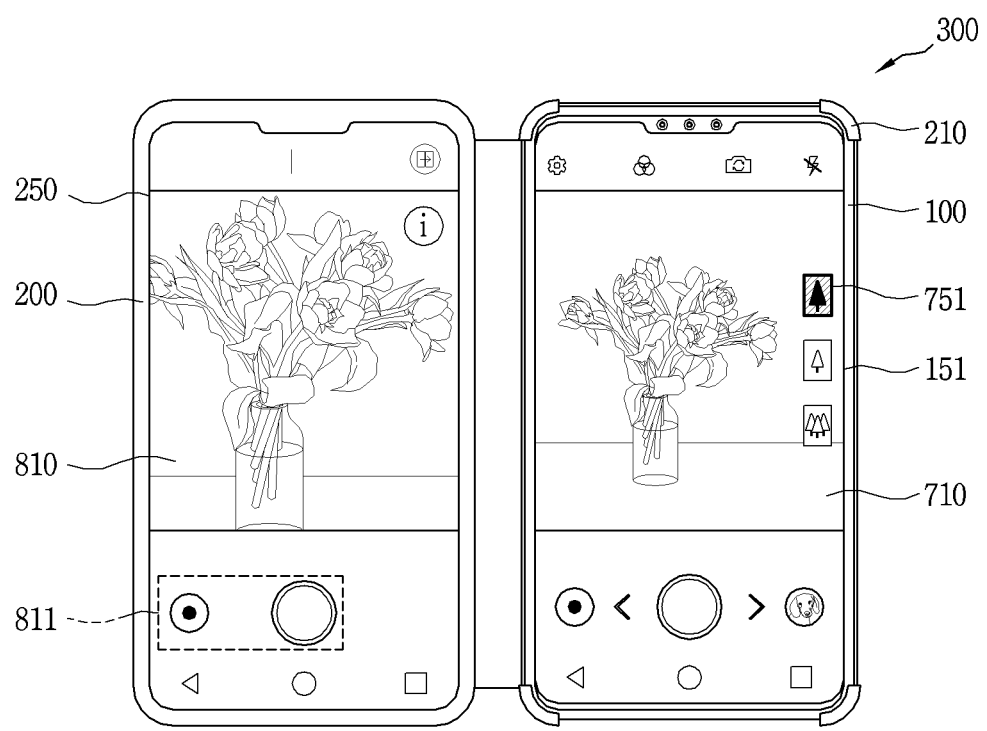

At this time, when a touch is applied to the icon 751 corresponding to the telephoto angle in the icon area 750, a lens corresponding to the touched icon 751 may be operated and thus a currently applied camera angle of view may be changed to the telephoto angle. Accordingly, as illustrated in FIG. 8E, the second preview screen 810 to which the telephoto angle has been actually applied may be displayed on the second display unit 250. Even at this time, the first preview screen 710 displayed on the first display unit 151 may be maintained as before.

According to the implementation, an angle of view to be applied to a subject to be captured can be determined while viewing an image, to which an angle of view has been actually applied, and the subject can be captured with the determined angle of view, on the second display unit. In addition, various angles of view can be compared by quickly changing them with respect to a subject to be captured. This may result in improving user convenience and usability.

As an additional implementation, a screen control method for the second display unit 250 when a camera function operated through the second display unit 250 is terminated will be described with reference to FIGS. 9A, 9B, 11A, and 11B.

Figure 9A:
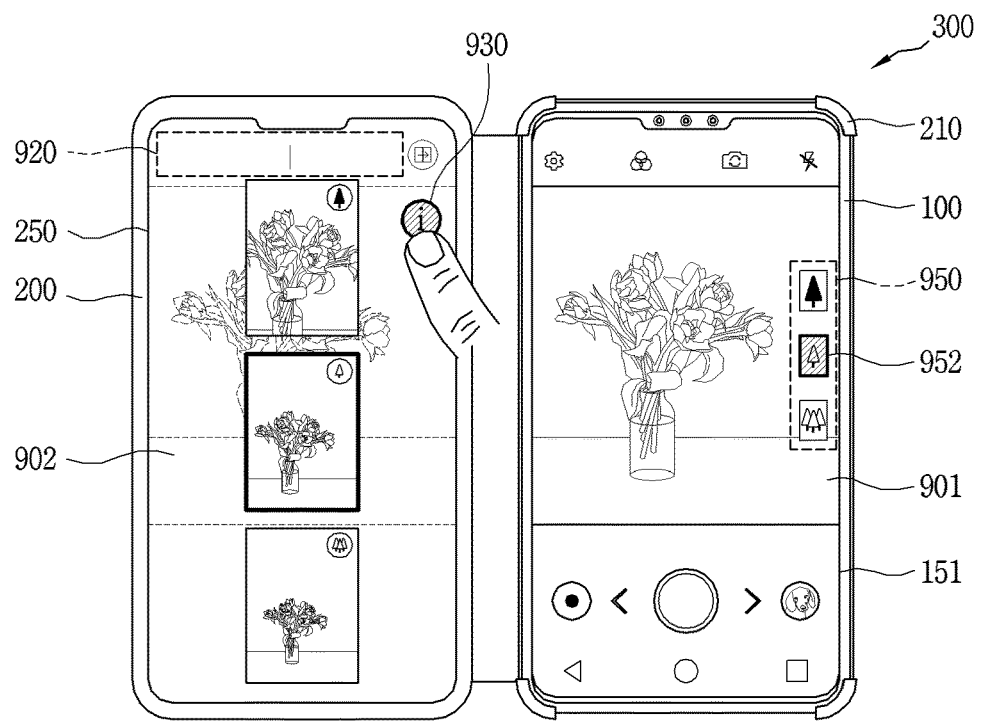
Figure 9B:
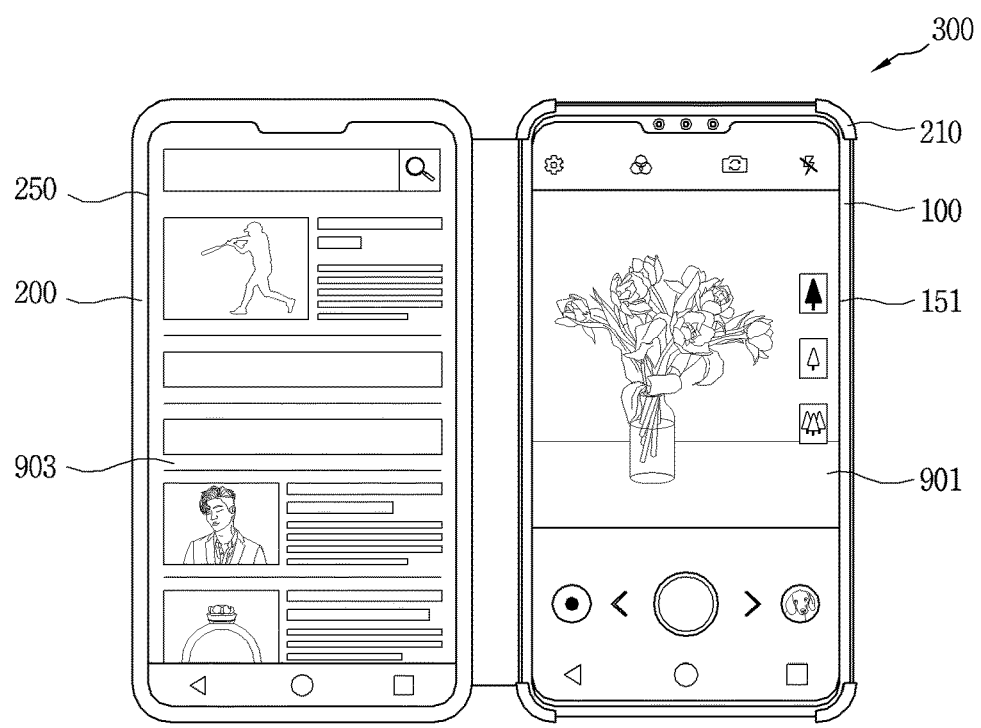

First, referring to FIGS. 9A and 9B, a camera preview screen 901 may be displayed on the first display unit 151, and second screen information 902 that corresponds to an expanded preview mode may be displayed on the second display unit 250 according to a preset touch input (e.g., 'long touch input') applied to a specific icon 952 of an icon area 950 of the preview screen 901. An icon 930 for terminating the expanded preview mode may be displayed on the second screen information 902.

The control unit 180 may terminate the expanded preview mode based on a touch input applied to the second screen information 902, for example, a touch input applied to the icon 930, and control the second display unit 250 to display first screen information 903. In this case, the first screen information 903 may be a screen which has been output to the second display unit 250 before entering the expanded preview mode or a home screen. Meanwhile, even at this time, the preview screen 901 displayed on the first display unit 151 may be maintained.

Figure 11A:
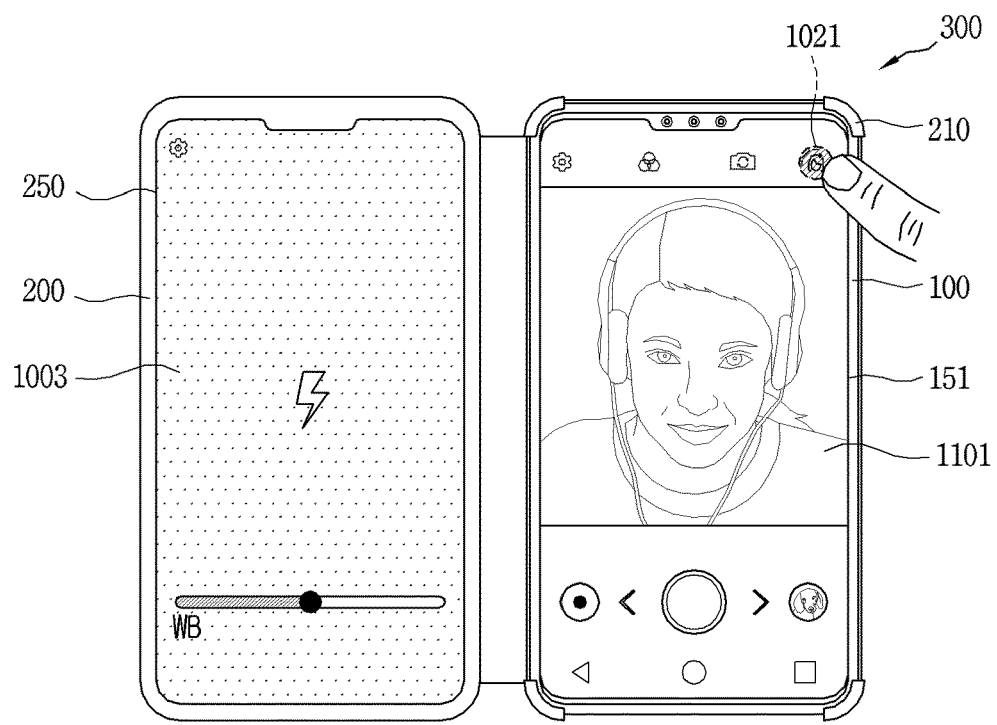
Figure 11B:
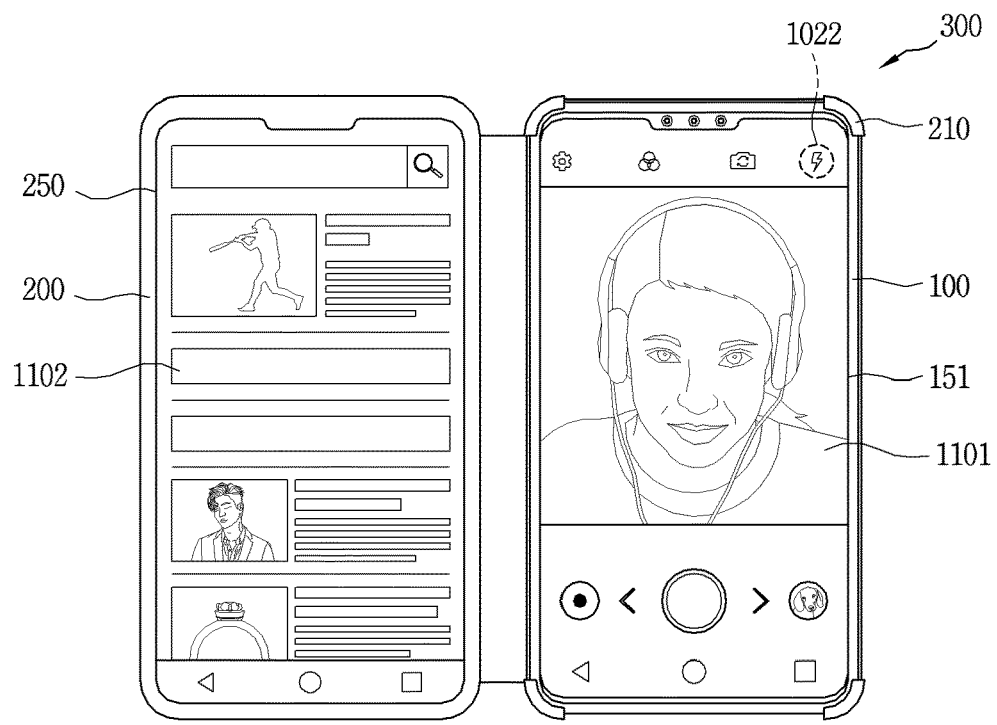

Referring to FIGS. 11A and 11B, a camera preview screen 1101 may be displayed on the first display unit 151, and second screen information 1003 that corresponds to a 'reflector capturing mode' may be displayed on the second display unit 250 according to a touch input applied to a flash icon 1021 located on one area (e.g., upper end area) of the preview screen 1101. The reflector capturing mode will be described in more detail later.

In this state, in response to an additional touch input being applied to the flash icon 1021 displayed on the first display unit 151, the control unit 180 may terminate the reflector capturing mode, and control the second display unit 250 display first screen information 1102, which has been output before the reflector capturing mode. Even at this time, the preview screen 1101 displayed on the first display unit 151 may be maintained. At this time, the flash icon may be changed to an image 1022 indicating another toggled setting function (e.g., flash-on).

Hereinafter, a method of applying a reflector function to a subject to be captured and easily adjusting a white balance using the second display unit 250 will be described with reference to FIGS. 10A, 10B, 10O, and 10D.

Figure 10A:
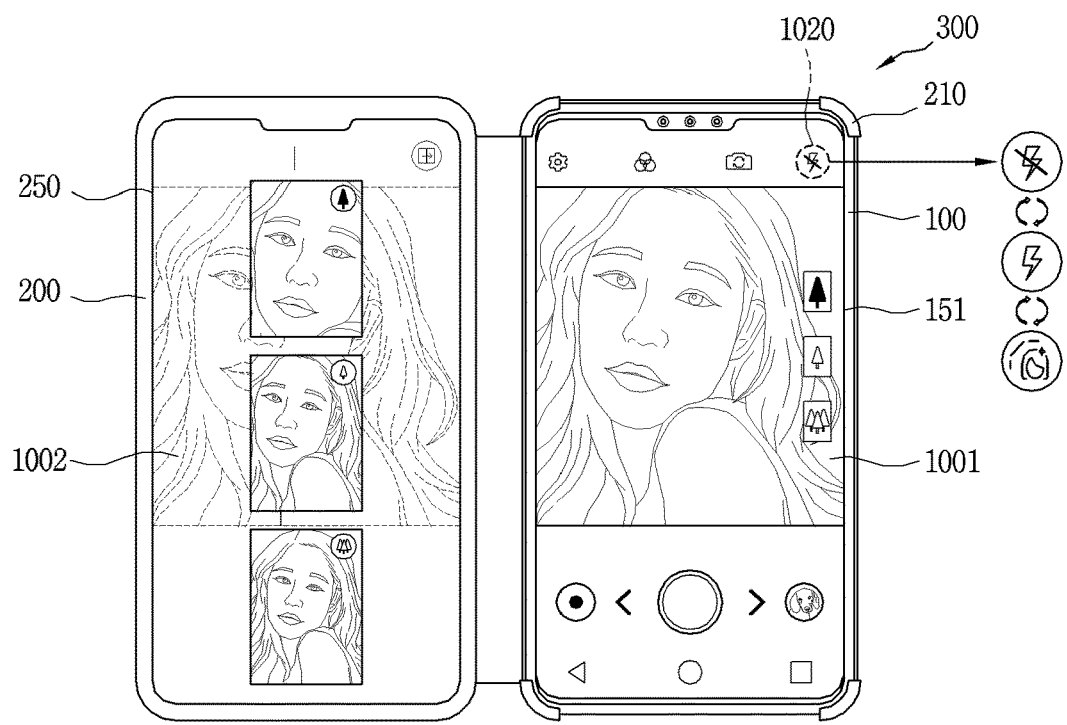

First, referring to FIG. 10A, a preview screen 1001 of a camera may be displayed on the first display unit 151, and second screen information 1002 corresponding to the expanded preview mode may be displayed on the second display unit 250. In this state, the control unit 180 may recognize a touch input that is applied to an icon 1020 for executing a reflector capturing mode (or a reflector capturing function) on the first display unit 151.

The illustrated icon 1020 may be toggled with a different setting function depending on an icon image which is output at the time when a touch input is applied. For example, settings of flash-off, flash-on, and a reflector for a reflector capturing mode may be toggled in a preset order whenever a touch input is applied. Also, an image of the icon 1020 may vary depending on a toggled function.

The flash-on setting may activate a flash of the first display unit 151. On the other hand, the reflector setting may activate the second display unit 250 as a reflector to provide a reflector function when capturing a subject through the first display unit 151.

Figure 10B:
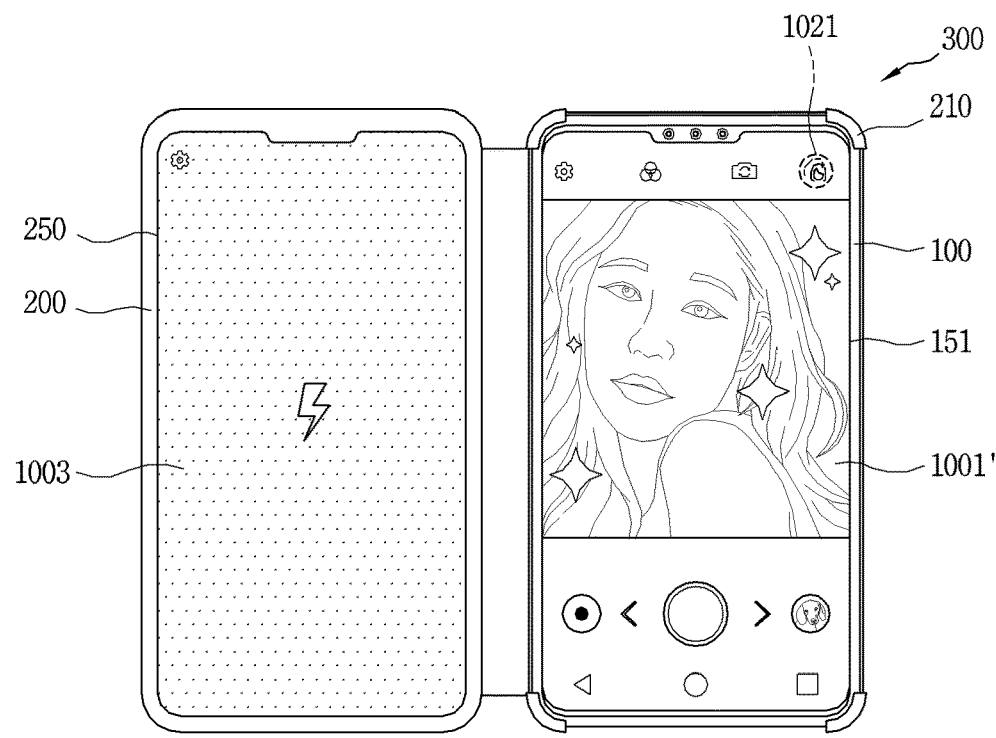
Figure 10C:
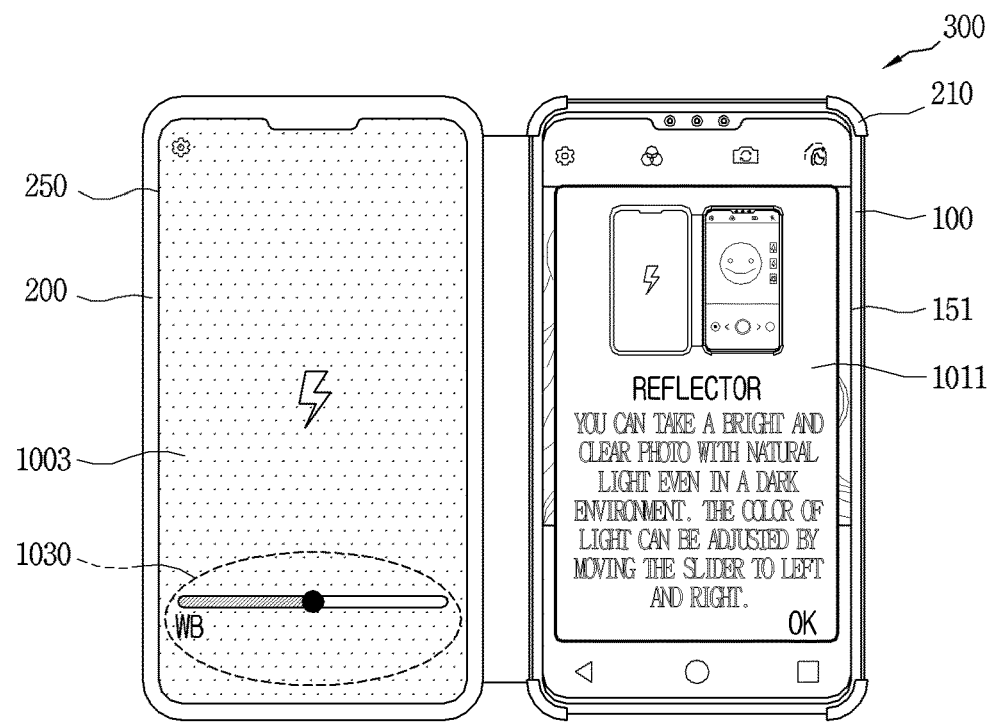

When the reflector capturing mode is executed according to the reflector setting in the first display unit 151, as illustrated in FIG. 10B, an image 1003 of a reflector to be applied to the preview screen 1001 of the first display unit 151 may be displayed as the second screen information on the second display unit 250. The image 1003 of the reflector may be displayed with a reflector of a predetermined color (e.g., silver or white) in an initial state. And, a preview screen 1001' to which a reflector function has been actually applied may be displayed on the first display unit 151.

The reflector function may be applied when the front camera 121a of the mobile terminal is operated and a preview screen is displayed on the first display unit 151. Therefore, if the rear camera 121b is operated, guide information informing that the reflector function cannot be applied may be output.

Also, in one example, as illustrated in FIG. 10O, when the reflector image 1003 is output to the second display unit 250, guide information 1011 for guiding the reflector capturing mode may be displayed on the first display unit 151 for a predetermined time. When the reflector capturing mode is executed as described above, the reflector image 1003 displayed on the second display unit 250 may become a reflector and apply reflected light to the subject. Accordingly, contrast of an image can be mitigated, a brighter image can be obtained, and soft light can be applied to a subject even when capturing against light.

A control bar/adjustment bar 1030 may be output to the reflector image 1003 so that a white balance (WB) value of reflected light to be applied to the subject can be easily adjusted.

Figure 10D:
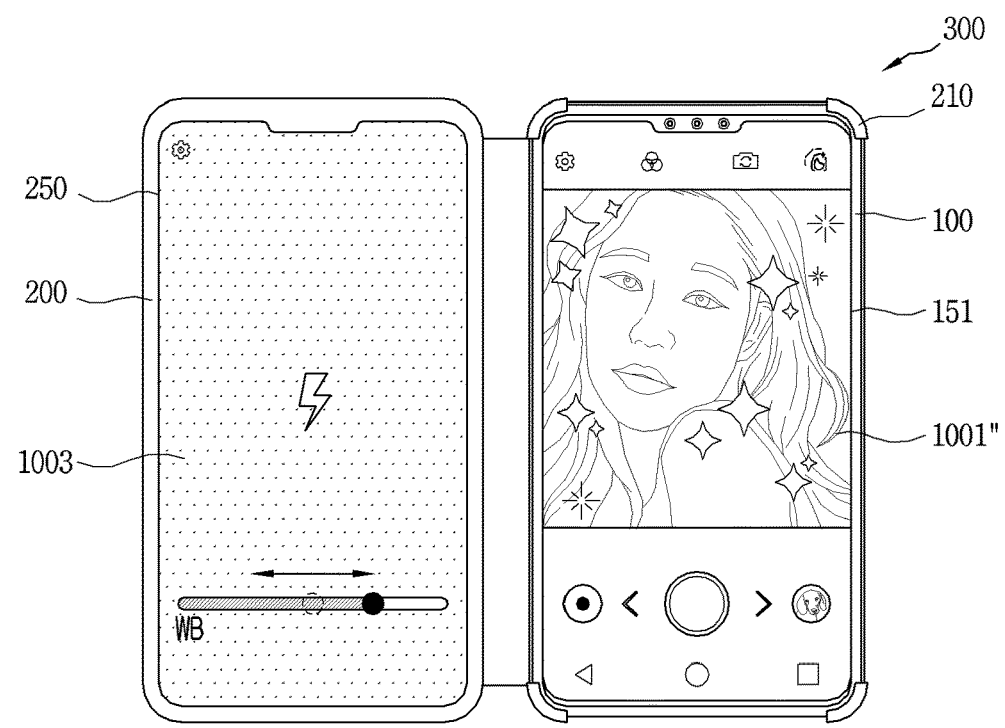

As illustrated in FIG. 10D, the WB value may be adjusted according to a drag touch input (e.g., a touch input slid in a left and right direction) applied to the control bar/adjustment bar 1030 output on the second display unit 250, the reflector image of the second display unit 250 may change to correspond to the adjusted WB value. Such a change in brightness of the reflector image 1003 may be applied only to the second display unit 250, and may be operated separately from system brightness of the electronic device 300. Accordingly, screen brightness of the first display unit 151 may be maintained as before.

Hereinafter, a method of synchronizing sub preview screens corresponding to a plurality of angles of view displayed on the second display unit when a screen magnification is adjusted on a preview screen after the expanded preview mode is executed will be described with reference to FIGS. 12A to 12C.

Figure 12A:
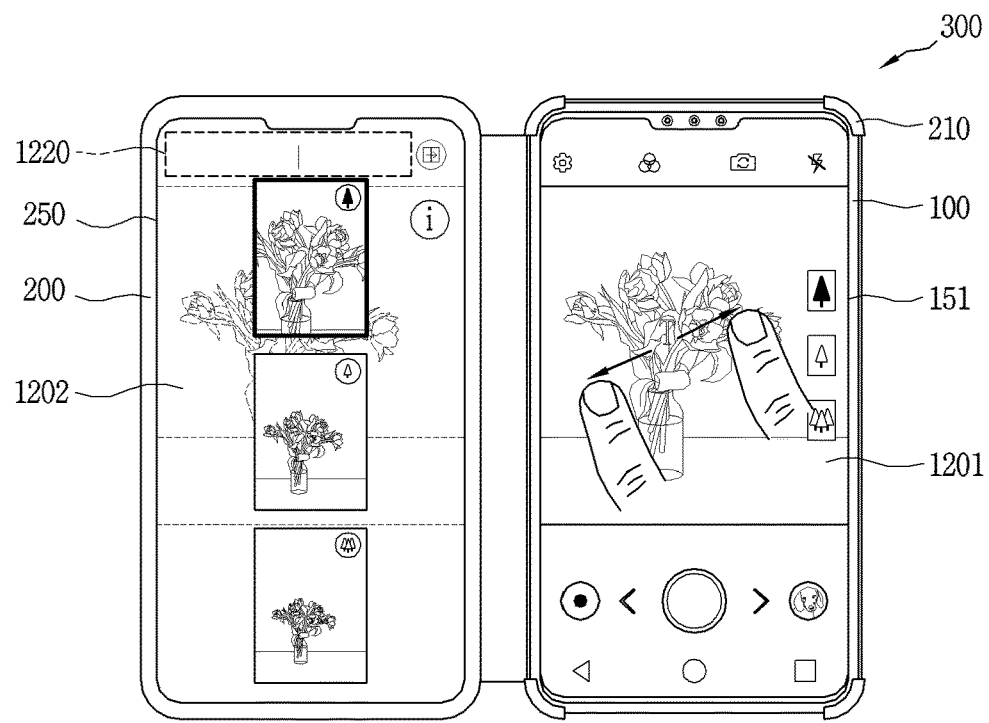

Referring FIG. 12A, while a preview screen 1201 of a camera is displayed on the first display unit 151, multi-angle sub preview screens for the preview screen 1201 may be displayed as second screen information 1202 on the second display unit 250. At this time, a menu area 1220 for executing the mirror mode may additionally be displayed in one area of the second screen information 1202.

Figure 12B:
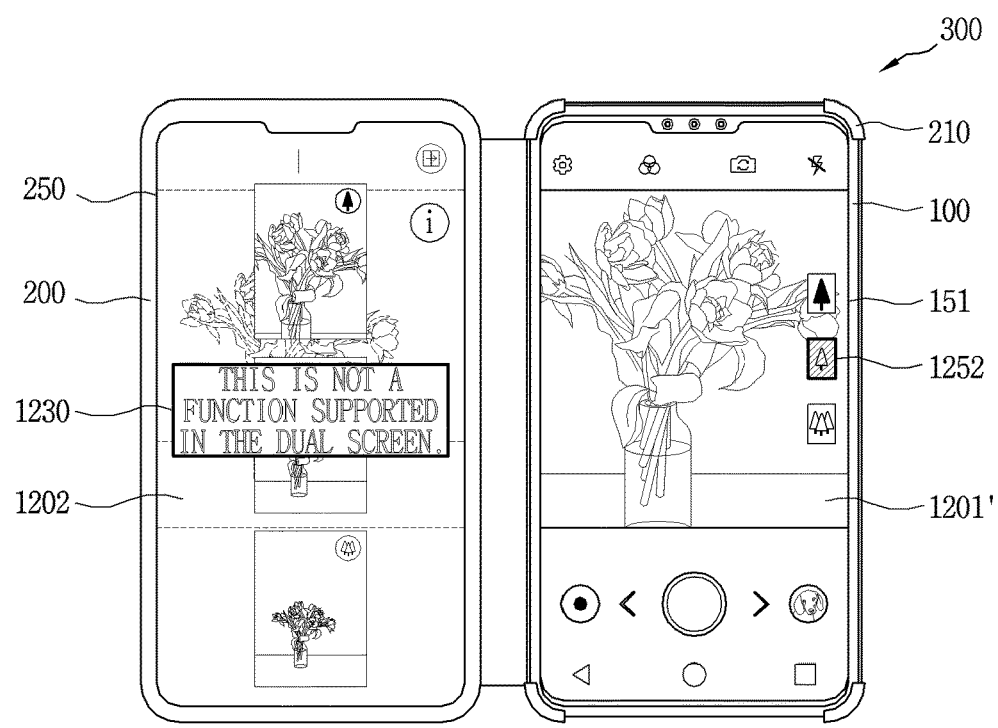
Figure 12C:
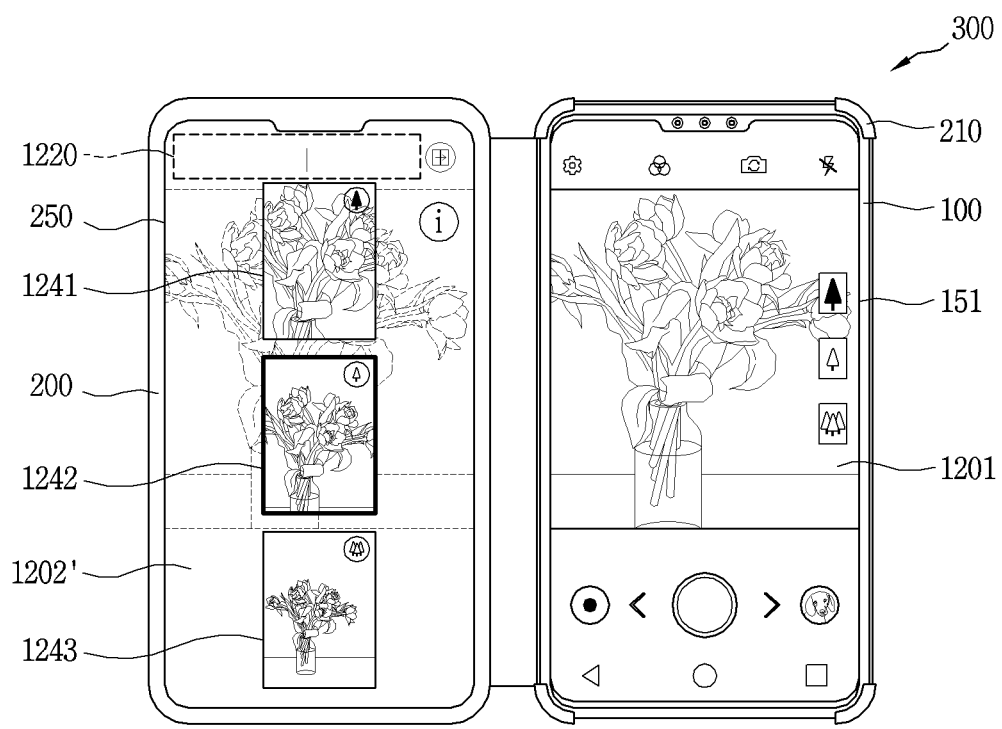

In this state, when a pinch-out gesture T is applied to the preview screen 1201 of the first display unit 151, a preview screen 1201' in which the screen magnification is zoomed in may be displayed as illustrated in FIG. 12B. Such adjustment of the screen magnification cannot be immediately reflected on the sub preview screens of the second display unit 250. Accordingly, guide information 1230 indicating that the corresponding function (screen zoom-in function) is not supported may be popped up to the second display unit 250.

Even at this time, when a touch signal of a touch input applied to a specific icon 1252 in the icon area of the first display unit 151 is received by the control unit 180, the control unit 180 may perform switching to a camera lens that matches the icon 1252 and apply the current camera angle of view.

In addition, the popped-up guide information 1230 may disappear after a predetermined time has elapsed. During the predetermined time, the sub preview screens of the second display unit 250 may be synchronized with the adjusted screen magnification. When the synchronization is completed, the guide information 1230 may disappear and, as illustrated in FIG. 12C, a graphic object indicating a camera angle of view selected through the first display unit 151 before the completion of the synchronization may be displayed on one (e.g., 1242) of the sub preview screens 1241, 1242, and 1243.

Hereinafter, a method of maintaining a preview screen for capturing a subject and capturing the subject while viewing a previously captured image by using the second display unit will be described with reference to FIGS. 13A and 13B.

Figure 13A:
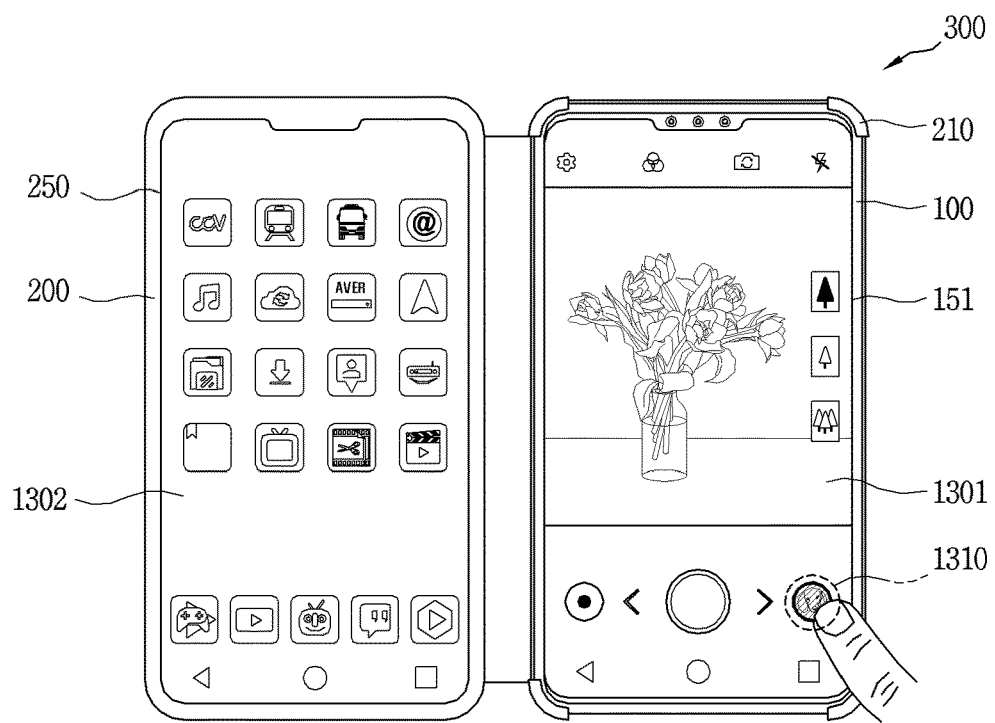

First, as illustrated in FIG. 13A, a camera preview screen 1301 may be displayed on the first display unit 151, and first screen information, for example, a home screen 1302, may be displayed on the second display unit 250.

In this state, when a preset touch input is applied to the first display unit 151, for example, a touch input is applied to a captured image viewing icon 1310, the control unit 180 may control a gallery application to be executed on the second display unit 250. Subsequently, the control unit 180 may control the second display unit 250 to display as the second screen information 1303 a stored image displayed on the icon 1310, namely, a first image, which has been stored by being captured before the preview screen 1310 is displayed. Accordingly, the capturing may be continued through the first display unit 151 without interruption while viewing a captured image on a large screen.

Figure 13B:
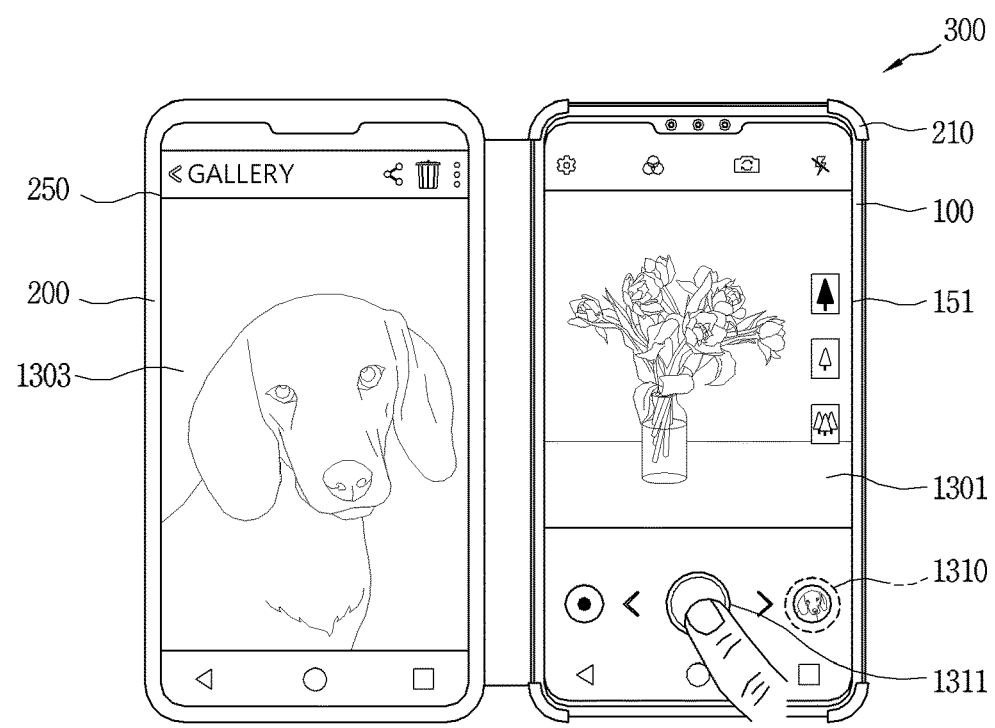
Figure 13C:
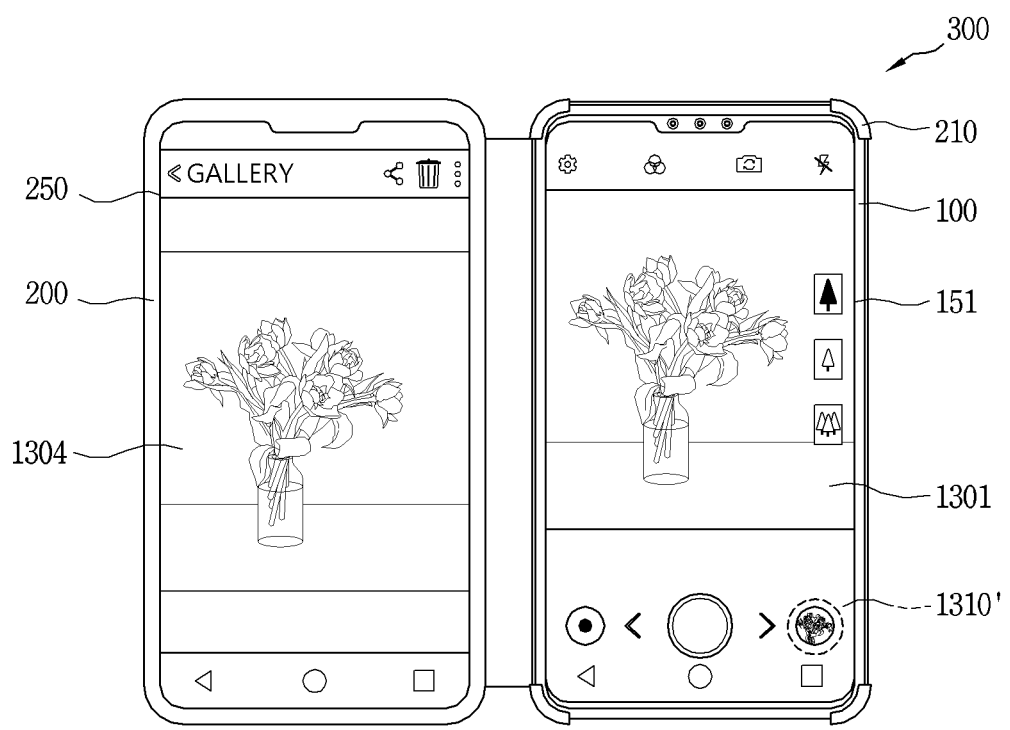

Afterwards, as illustrated in FIG. 13B, when the preview screen 1301 displayed on the first display unit 151 is captured through the capturing icon 1311, the image of the icon 1310 may be changed to a currently captured image 1310'.

In addition, the first image displayed on the second display unit 250 may be automatically switched to a second image 1304 that has been newly captured and stored in a gallery, or switched to the second image 1304 based on a touch input to the icon 1310'.

FIGS. 14A, 14B, 14C, 15A, 15B, 16A, 16B, 17A, and 17B are views illustrating various implementations related to a screen control of first and second display units while a preview image on the first display unit is captured in response to an activation of a camera on the first display unit.

Figure 14A:
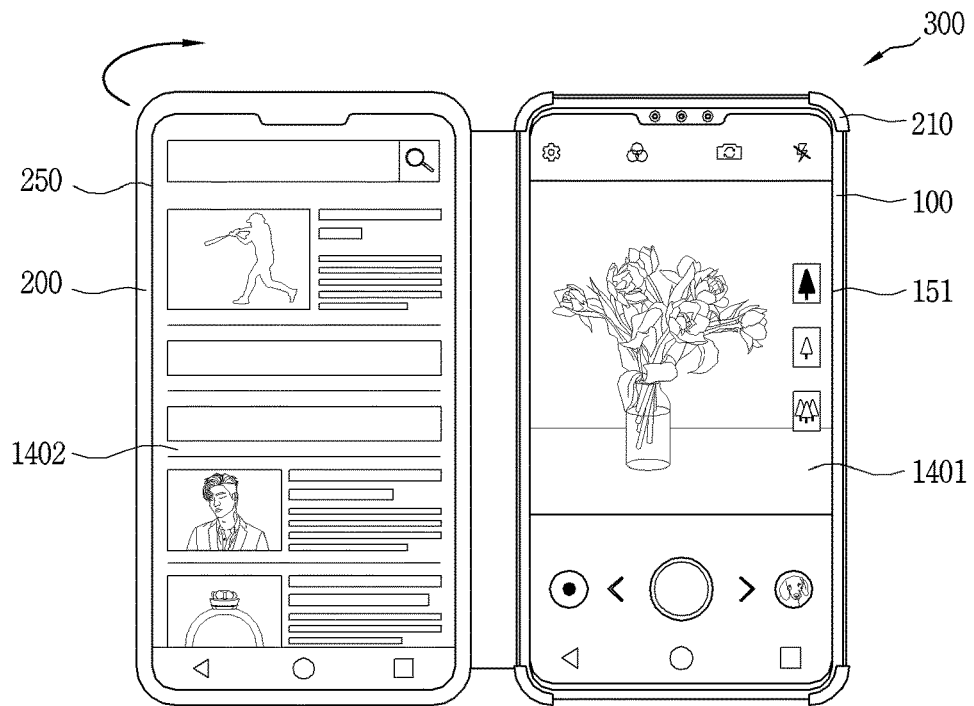
Figure 14B:
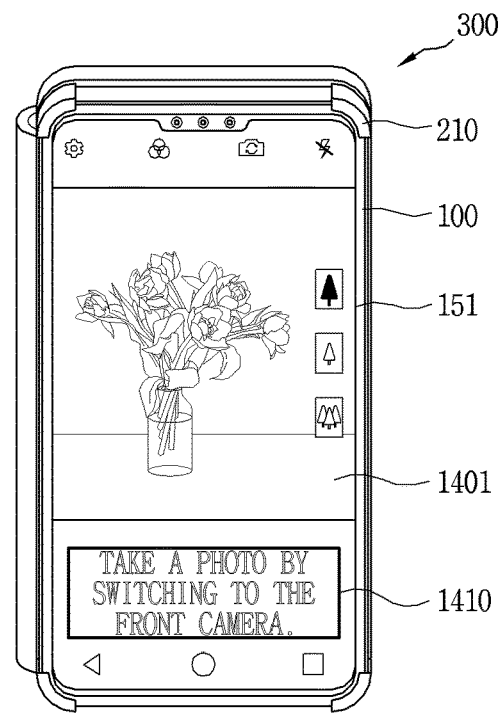
Figure 14C:
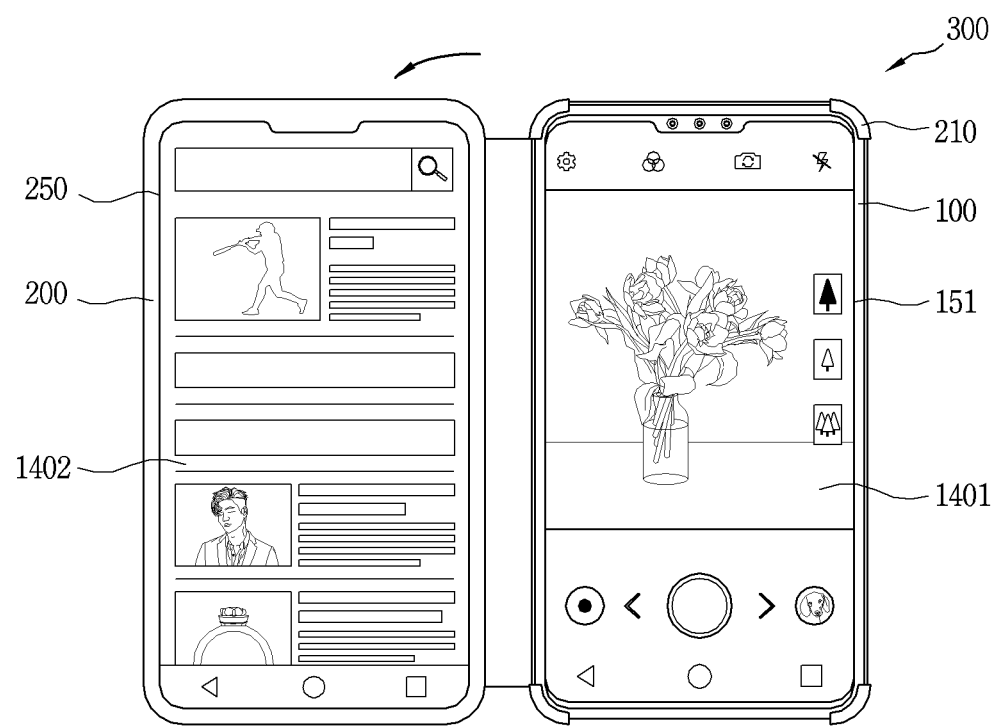

FIGS. 14A, 14B, and 14C illustrate a case where the second body rotates relative to the first body to be bent or folded backward such that the electronic device is switched to the fully open state, in a state in which a preview scree 1401 displayed on the first display unit 151 is a preview screen corresponding to the operation of the rear camera 121b of the mobile terminal and first screen information 1402 is displayed on the second display unit 250.

In this case, the rear camera 121b may be obscured by the second body, and thus guide information 1410 for inducing the use of the front camera 121a may be provided on the preview screen of the first display unit 151. On the other hand, when the electronic device that has been switched to the fully open state is switched back to the open state as illustrated in FIG. 14A, the guide information 1410 may disappear.

Figure 15A:
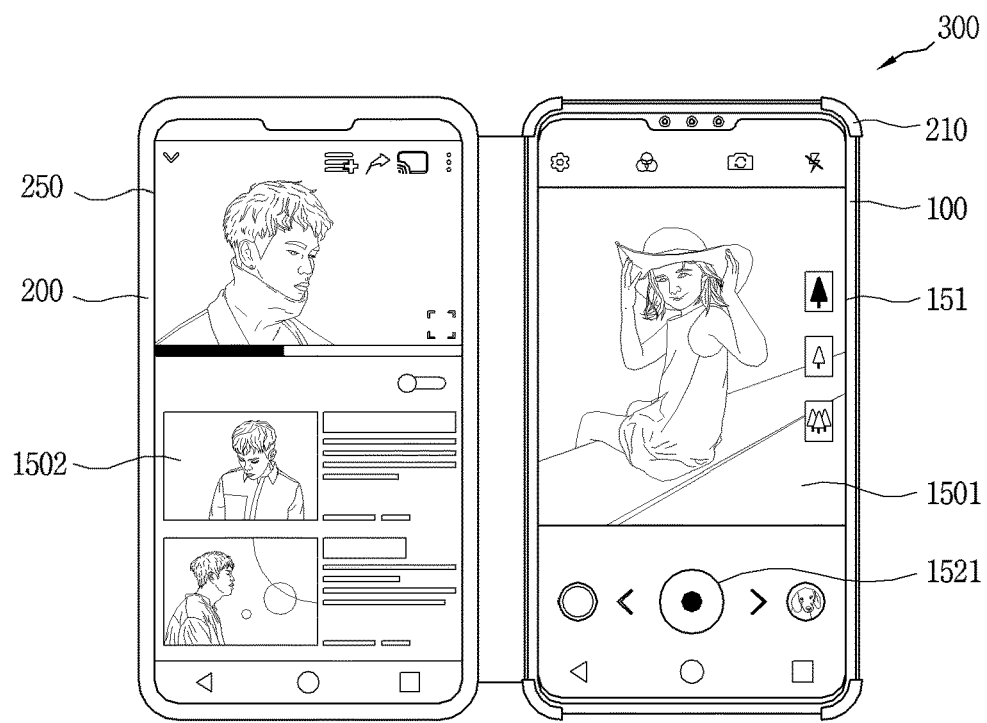
Figure 15B:
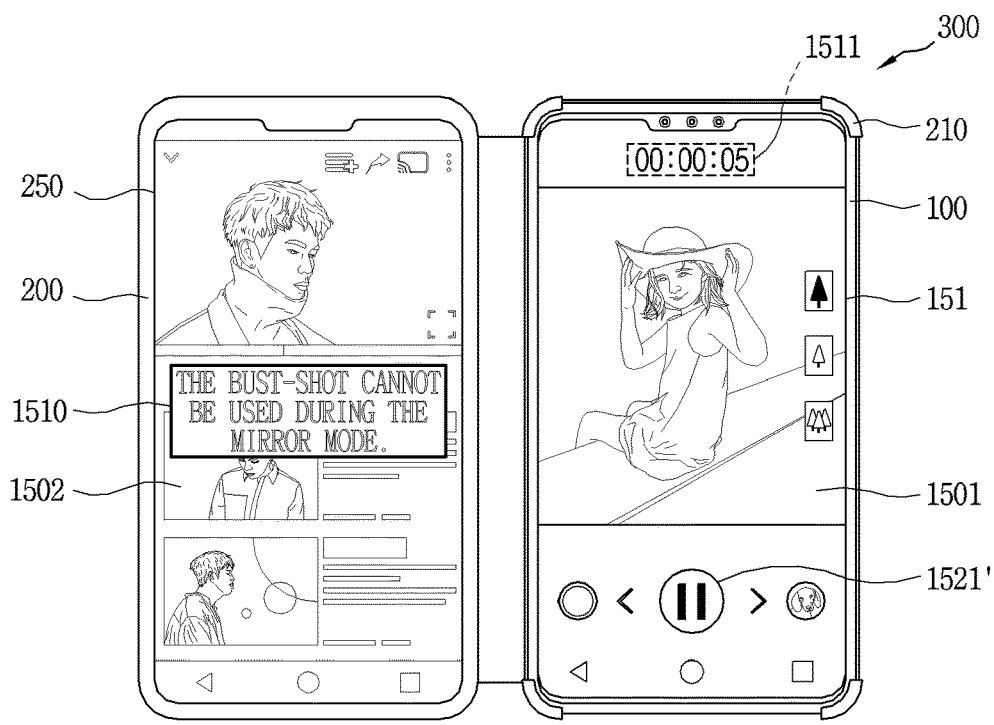

FIGS. 15A and 15B illustrate a case of operating a recording (or video-capturing) function for a preview screen 1501 using a capturing icon 1521 in a state where the preview screen 1501 is displayed on the first display unit 151 and a video 1502 is displayed as first screen information on the second display unit 250. At this time, guide information 1510 informing that the video being displayed on the second display unit 250 cannot be played may be popped up, and the control unit 180 may control the playback of the video 1502 to be stopped until the recording of the preview screen 1501 is stopped/finished by using a capturing icon 1521'. When the recording of the preview screen 1501 is stopped/finished, total recording time information 1511 may be displayed on the first display unit 151, and the video 1502 may be automatically played back, starting from the stopped time, on the second display unit 250.

Figure 16A:
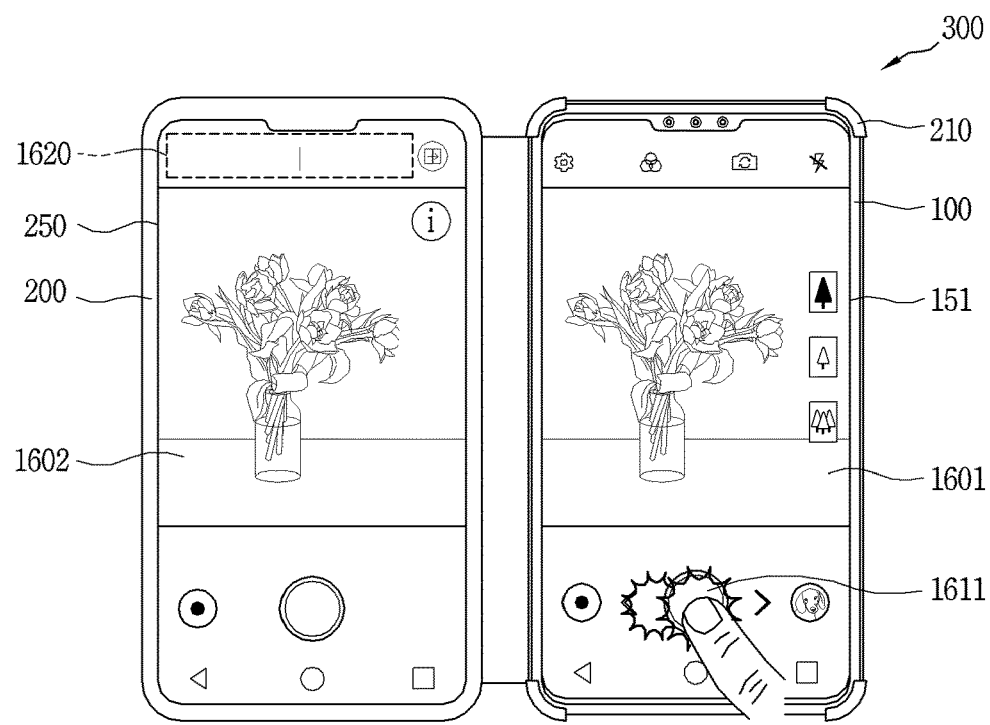
Figure 16B:
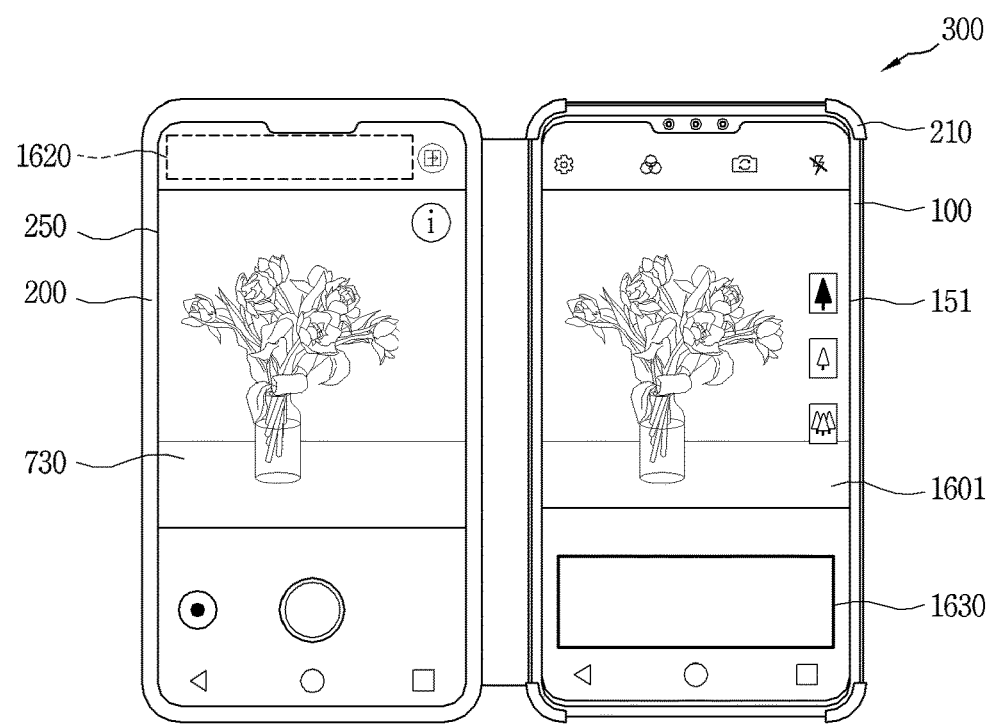

In addition, as illustrated in FIGS. 16A and 16B, in a state where a preview screen 1601 of a camera is displayed on the first display unit 151, and screen information 1602 corresponding to the execution of the mirror mode 1620 is displayed on the second display unit 250, when a touch input is continuously applied to the capturing icon 1601 displayed on the first display unit 151, the control unit 180 may restrict an execution of burst-shot capturing and control the first display unit 151 to output corresponding guide information 1630. At this time, the execution of the mirror mode in the second display unit 250 may be maintained.

Figure 17A:
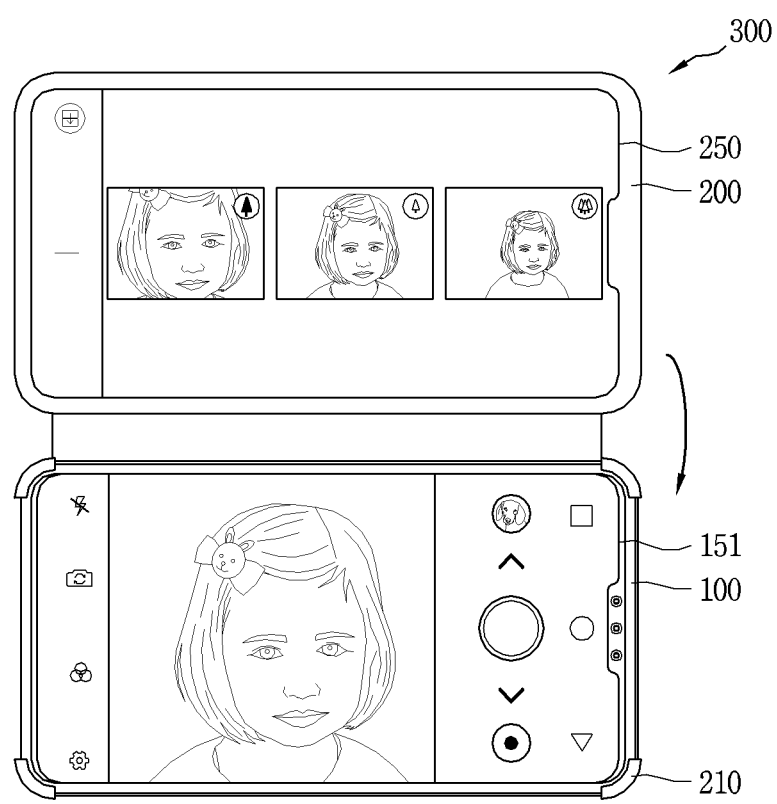

As another example, as illustrated in FIGS. 17A and 17B, the display units of the electronic device 300 may be oriented in a landscape mode, a preview screen 1601 of a camera may be displayed on the first display unit 151, and a plurality of sub preview screens corresponding to the execution of the expanded preview mode may be displayed on the second display unit 250. In this state, the second body may be bent or folded backward such that the electronic device is in the fully open state.

In this case, a video screen set as a favorite may be played back on the second display unit 250, instead of the sub preview screens, after changing the oriented direction of the electronic device. On the other hand, the preview screen of the first display unit 151 facing the user who captures the screen may be displayed continuously in the oriented direction.

At this time, in order for the rear camera 121b of the mobile terminal 100 to be continuously used, an area R corresponding to the rear camera 121b in the second body may be provided with a hole or made of a transparent/translucent material.

As described above, in a mobile terminal and an electronic device having the mobile terminal according to the present disclosure, various camera functions related to a preview screen can be used more efficiently by using an expanded display area. In the present disclosure, a plurality of sub preview screens, to which a plurality of angles of view are applied, can be previewed on a large screen through a second display unit while maintaining a size of a preview image of a camera displayed on a first display unit. Capturing a subject can be carried out by selecting an appropriate angle of view while viewing images, to which different angles of view have been actually applied, through the second display unit, thereby simultaneously improving user convenience and usability. A reflector function can be provided on a preview screen displayed on the first display unit by using the second display unit, such that contrast of an image can be mitigated, a brighter image can be obtained, and soft light can be applied to a subject even when capturing against light.

The invention claimed is:

1. An electronic apparatus comprising a mobile terminal and a case to which the mobile terminal is coupled,
   wherein the mobile terminal comprises:
   a terminal body coupled to the case;
   a camera provided on the terminal body and having a plurality of lenses;
   a control unit; and
   a first display unit coupled to the case,
   wherein the case comprises:
   a first body to accommodate at least a portion of the terrain, body;
   a second body provided with a second display unit;

a wiring part electrically connecting the first body and the second body, such that data received from the mobile terminal is transmitted to the second display unit; and a wireless communication unit connected to the wiring part to transmit and receive signals to and from the mobile terminal, wherein the control unit of the mobile terminal, in a state where first screen information is displayed on the second display unit and a preview screen is displayed on the first display unit, detects a preset touch input received by the first display unit, executes an expanded preview mode according to the preset touch input, generates a control signal for displaying second screen information corresponding to a camera function related to the preview screen on the second display unit so as to transmit the control signal to the second display unit through the wiring part and the wireless communication unit, and switches the first screen information displayed on the second display unit to the second screen information according to the control signal while the preview screen is displayed on the first display unit, and wherein the second screen information includes a plurality of sub preview screens corresponding to a plurality of angles of view corresponding to the plurality of lenses to the preview screen.

2. The electronic apparatus of claim 1, wherein the preview screen of the first display unit displays an icon for selectively applying the plurality of angles of view corresponding to the plurality of lenses to the preview screen, and wherein the expanded preview mode is executed when the preset touch input is applied to the icon.

3. The electronic apparatus of claim 2, wherein the control unit of the mobile terminal, when a touch signal of a touch input applied to any one of the plurality of sub preview screens displayed on the second display unit is received, applies an angle of view corresponding to a sub preview screen, to which the touch input has been applied, to a preview screen to be captured, and transmits a control signal for displaying a graphic object indicating the applied angle of view on the one sub preview screen to the second display unit.

4. The electronic apparatus of claim 2, wherein an angle of view of a preview screen to be captured is changed to an angle of view corresponding to a touch input when the touch input for changing the angle of view of the preview screen is applied to the first display unit while the second screen information is displayed, and wherein a control signal for displaying a graphic object indicating the changed angle of view on one of the plurality of sub preview screens is transmitted to the second display unit.

5. The electronic apparatus of claim 2, wherein third screen information, in which one of the sub preview screens included in the second screen information is expanded to the entire second display unit, is displayed on the second display unit when a touch input is applied to a predetermined area of the second screen information, and wherein the one sub preview screen corresponds to an angle of view currently applied to the preview screen of the first display unit, and a capturing icon for capturing the one sub preview screen is displayed on the third screen information.

6. The electronic apparatus of claim 5, wherein the control unit of the mobile terminal, when the touch input is applied to the predetermined area of the second screen information, pops up guide information on the preview screen of the first display unit, the guide information informing that capturing is allowed to be carried out on the second display unit using the third screen information.

7. The electronic apparatus of claim 5, wherein the control unit of the mobile terminal controls the second display unit to change the sub preview screen displayed on the third screen information to a second sub preview screen corresponding to a changed angle of view, in response to a change in the angle of view to be applied to the preview screen based on a touch input applied to the first display unit.

8. The electronic apparatus of claim 2, wherein the control unit of the mobile terminal terminates the expanded preview mode based on a touch input applied to the second screen information, and controls the second display unit to display the first screen information while maintaining the preview screen of the first display unit.

9. The electronic apparatus of claim 1, wherein, in response to a touch input being applied to an icon for executing a reflector capturing function on the first display unit while the second screen information is displayed, a reflector capturing mode is executed by activating a camera flash of the mobile terminal, and the second display unit displays an image of a reflector to be applied to the preview screen as the second screen information.

10. The electronic apparatus of claim 9, wherein the second screen information outputs thereon a control bar for adjusting white balance (WB) to be applied to the preview screen of the first display unit in the reflector capturing mode, and wherein the image of the reflector corresponding to the white balance adjusted according to a drag touch input applied to the control bar changes differently.

11. The electronic apparatus of claim 2, wherein the plurality of sub preview screens of the second display unit are displayed by applying an adjusted magnification after a predetermined time elapses, when the magnification of the preview screen is adjusted according to a preset touch gesture applied to the first display unit while the second screen information is displayed.

12. The electronic apparatus of claim 1, wherein, when the preset touch input is applied to the first display unit, a gallery application is executed on the second display unit and a first image captured and stored before the preview screen is displayed as the second screen information, and wherein the first image of the second display unit is changed to a newly captured and stored second image when the preview screen displayed on the first display unit is captured.

13. A method for controlling an electronic apparatus including a mobile terminal and a case to which the mobile terminal is coupled, wherein the mobile terminal comprises a camera having a plurality of lenses, and a first display unit coupled to the case, and the case comprises a first body to accommodate the mobile terminal and a second body having a second display unit, the method comprising:

displaying first screen information on the second display unit and displaying a preview screen on the first display unit according to an operation of the camera;

detecting a preset touch input received by the first display unit;

executing an expanded preview mode according to the preset touch input and generating a control signal for displaying second screen information corresponding to a camera function related to the preview screen on the second display unit so as to transmit the control signal to the second display unit; and switching the first screen information the second display unit to the second screen information according to the control signal while the preview screen is displayed on the first display unit, wherein the second screen information includes a plurality of sub preview screens corresponding to a plurality of angles of view corresponding to the plurality of lenses to the preview screen.

14. The method for controlling the electronic apparatus of claim 13, wherein the preview screen of the first display unit displays an icon for selectively applying the plurality of angles of view corresponding to the plurality of lenses to the preview screen, and wherein the expanded preview mode is executed when the preset touch input is applied to the icon.

15. The method for controlling the electronic apparatus of claim 13, wherein a control unit of the mobile terminal, when a touch signal of a touch input applied to any one of the plurality of sub preview screens displayed on the second display unit is received, applies an angle of view corresponding to a sub preview screen, to which the touch input has been applied, to a preview screen to be captured, and transmits a control signal for displaying a graphic object indicating the applied angle of view on the one sub preview screen to the second display unit.

16. The method for controlling the electronic apparatus of claim 13, further comprising:

in response to a touch input being applied to an icon for executing a reflector capturing function on the first display unit while the second screen information is displayed, executing a reflector capturing mode by activating a camera flash of the mobile terminal, and displaying by the second display unit an image of a reflector to be applied to the preview screen as the second screen information.

17. The method for controlling the electronic apparatus of claim 16, wherein the second screen information outputs thereon a control bar for adjusting white balance (WB) to be applied to the preview screen of the first display unit in the reflector capturing mode, and wherein the image of the reflector corresponding to the white balance adjusted according to a drag touch input applied to the control bar changes differently.

18. The method for controlling the electronic apparatus of claim 14, wherein the plurality of sub preview screens of the second display unit are displayed by applying an adjusted magnification after a predetermined time elapses, when the magnification of the preview screen is adjusted according to a preset touch gesture applied to the first display unit while the second screen information is displayed.

19. The method for controlling the electronic apparatus of claim 13, wherein, when the preset touch input is applied to the first display unit, a gallery application is executed on the second display unit and a first image captured and stored before the preview screen is displayed as the second screen information, and wherein the first image of the second display unit is changed to a newly captured and stored second image when the preview screen displayed on the first display unit is captured.

20. An electronic apparatus comprising a mobile terminal and a case to which the mobile terminal is coupled, wherein the mobile terminal comprises:

a terminal body coupled to the case;

a camera provided on the terminal body and having a plurality of lenses; and a first display unit coupled to the case, wherein the case comprises:

a first body to accommodate at least a portion of the terminal body;

a second body provided with a second display unit;

a wiring part electrically connecting the first body and the second body, such that data received from the mobile terminal is transmitted to the second display unit; and a wireless communication unit connected to the wiring part to transmit and receive signals to and from the mobile terminal, wherein a control unit of the mobile terminal, in a state where first screen information is displayed on the second display unit and a preview screen is displayed on the first display unit, detects a preset touch input received by the first display unit, executes an expanded preview mode according to the preset touch input, generates a control signal for displaying second screen information corresponding to a camera function related to the preview screen on the second display unit so as to transmit the control signal to the second display unit through the wiring part and the wireless communication unit, and switches the first screen information of the second display unit to the second screen information according to the control signal while the preview screen is displayed on the first display unit, wherein, when the preset touch input is applied to the first display unit, a gallery application is executed on the second display unit and a first image captured and stored before the preview screen is displayed is displayed as the second screen information, and wherein the first image of the second display unit is changed to a newly captured and stored second image when the preview screen displayed on the first display unit is captured.

* * * * *